(12) United States Patent
Shim et al.

(10) Patent No.: US 12,225,523 B2
(45) Date of Patent: Feb. 11, 2025

(54) COVERAGE ENHANCEMENT

(71) Applicant: LG Electronics Inc., Seoul (KR)

(72) Inventors: Jaenam Shim, Seoul (KR); Hyunsoo Ko, Seoul (KR); Suckchel Yang, Seoul (KR); Hyangsun You, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/576,568

(22) Filed: Jan. 14, 2022

(65) Prior Publication Data

US 2022/0225363 A1 Jul. 14, 2022

(30) Foreign Application Priority Data

Jan. 14, 2021 (KR) ........................ 10-2021-0005307

(51) Int. Cl.
*H04W 72/12* (2023.01)
*H04L 1/08* (2006.01)
*H04W 72/1268* (2023.01)
*H04W 72/23* (2023.01)

(52) U.S. Cl.
CPC ........... *H04W 72/1268* (2013.01); *H04L 1/08* (2013.01); *H04W 72/23* (2023.01)

(58) Field of Classification Search
CPC .. H04W 72/1268; H04W 72/1289; H04L 1/08
See application file for complete search history.

(56) References Cited

U.S. PATENT DOCUMENTS

| 10,749,640 | B2 | 8/2020 | Kim et al. | |
|---|---|---|---|---|
| 2019/0174541 | A1* | 6/2019 | Wang | H04W 72/23 |
| 2019/0313436 | A1* | 10/2019 | Lee | H04W 72/0413 |
| 2020/0383105 | A1* | 12/2020 | Park | H04L 1/1819 |
| 2021/0298108 | A1* | 9/2021 | Wu | H04W 74/0833 |
| 2022/0104138 | A1* | 3/2022 | Park | H04L 5/0094 |

FOREIGN PATENT DOCUMENTS

| CN | 114630410 A | * | 6/2022 | .......... H04W 52/146 |
|---|---|---|---|---|
| KR | 10-2019-0128690 | | 11/2019 | |
| KR | 10-2020-0134927 | | 12/2020 | |

OTHER PUBLICATIONS

LG Electronics, "Discussions on PUCCH Coverage Enhancement," 3GPP TSG RAN WG1 #103-e, R1-2008404, e-Meeting, Oct. 26-Nov. 13, 2020, 5 pages.
PCT International Search Report in International Application No. PCT/KR2022/000743, dated May 2, 2022, 8 pages (with English translation).
Qualcomm Incorporated, "Potential coverage enhancement techniques for PUSCH," 3GPP TSG-RAN WG1 Meeting #103e, R1-2009729, e-Meeting, Oct. 26-Nov. 13, 2020, 14 pages.
Samsung, "PUCCH coverage enhancement," 3GPP TSG RAN WG1 #103-e, R1-2008182, e-Meeting, Oct. 26-Nov. 2020, 9 pages.
Vivo, "Discussion on Solutions for PUCCH coverage enhancement," 3GPP TSG-RAN WG1 #103-e, R1-2008942, e-Meeting, Oct. 26-Nov. 13, 2020, 11 pages.

(Continued)

*Primary Examiner* — Kibrom T Hailu
*Assistant Examiner* — Zhaohui Yang
(74) *Attorney, Agent, or Firm* — Fish & Richardson P.C.

(57) ABSTRACT

The present disclosure proposes a synchronization method for the DU transmission timing of the IAB node.

13 Claims, 24 Drawing Sheets

(56) References Cited

OTHER PUBLICATIONS

Moderator (Apple Inc.), "Summary of Email discussion [100b-e-NR-Llenh-URLLC-PUSCH-04] on PUSCH enhancements for NR eURLLC (AI 7.2.5.3)," 3GPP TSG-RAN WGI Meeting #100bis-e, R1-2003006, e-Meeting, Apr. 20-Apr. 30, 2020, 39 pages.
Office Action in Korean Appln. No. 10-2023-7001536, mailed on Oct. 31, 2023, 10 pages (with English translation).
Xiaomi, "PUSCH coverage enhancement," 3GPP TSG RAN WGI #103-e, R1-2007640, e-Meeting, Oct. 26-Nov. 13, 2020, 7 pages.
InterDigital Inc., "PUSCH coverage enhancements," 3GPP TSG RAN WG1, Meeting #103-e, R1-2009583, e-Meeting, Oct. 26-Nov. 13, 2020, 19 pages.
Notice of Allowance in Korean Appln. No. 10-2023-7001536, mailed on Feb. 2, 2024, 6 pages (with English translation).
Samsung, "Considerations on potential techniques for coverage enhancement," 3GPP TSG RAN WG1, Meeting #101-e, R1-2003916, e-Meeting, May 25-Jun. 5, 2020, 6 pages.

\* cited by examiner

COVERAGE ENHANCEMENT

CROSS-REFERENCE TO RELATED APPLICATION

Pursuant to 35 U.S.C. § 119 (a), this application claims the benefit of Korean Patent Application No. 10-2021-0005307 filed on Jan. 14, 2021, the contents of which are all hereby incorporated by reference herein in their entirety.

BACKGROUND OF THE DISCLOSURE

Field of the Disclosure

The present disclosure relates to wireless communication.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

In a next-generation wireless communication system, coverage enhancement (CE) for uplink signals has been discussed for a physical uplink shared channel (PUSCH), a physical uplink control channel (PUCCH), and other signals. In relation to coverage enhancement, a method for performing repetition on PUCCH/PUSCH and a DMRS bundle in the PUSCH and PUCCH have been discussed.

SUMMARY OF THE DISCLOSURE

The present disclosure provides various methods for coverage enhancement. According to an embodiment of the present disclosure, when an unavailable resource exists in a resource set configured for repeated transmission of a physical uplink channel, a user equipment (UE) may actually determine a resource for performing repeated transmission of the physical uplink channel within the resource set. According to another embodiment of the present disclosure, when the UE receives a TPC command within a resource corresponding to a DMRS bundle, the UE may perform power control based on the TPC command after the resource.

Advantageous Effects

According to the present disclosure, ambiguity that may occur when configuration of a DMRS bundle of a network and availability of a time domain resource of the UE collide may be eliminated. In addition, since power of the DMRS bundle is maintained, channel estimation performance may be improved.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

BRIEF DESCRIPTION OF THE DRAWINGS

The following drawings were created to explain a specific example of the present disclosure. Since the names of specific devices described in the drawings or the names of specific signals/messages/fields are presented by way of example, the technical features of the present disclosure are not limited to the specific names used in the following drawings.

DESCRIPTION OF EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

In the present disclosure, technical features that are individually described within one figure may be implemented individually or may be implemented at the same time.

Figure 1:
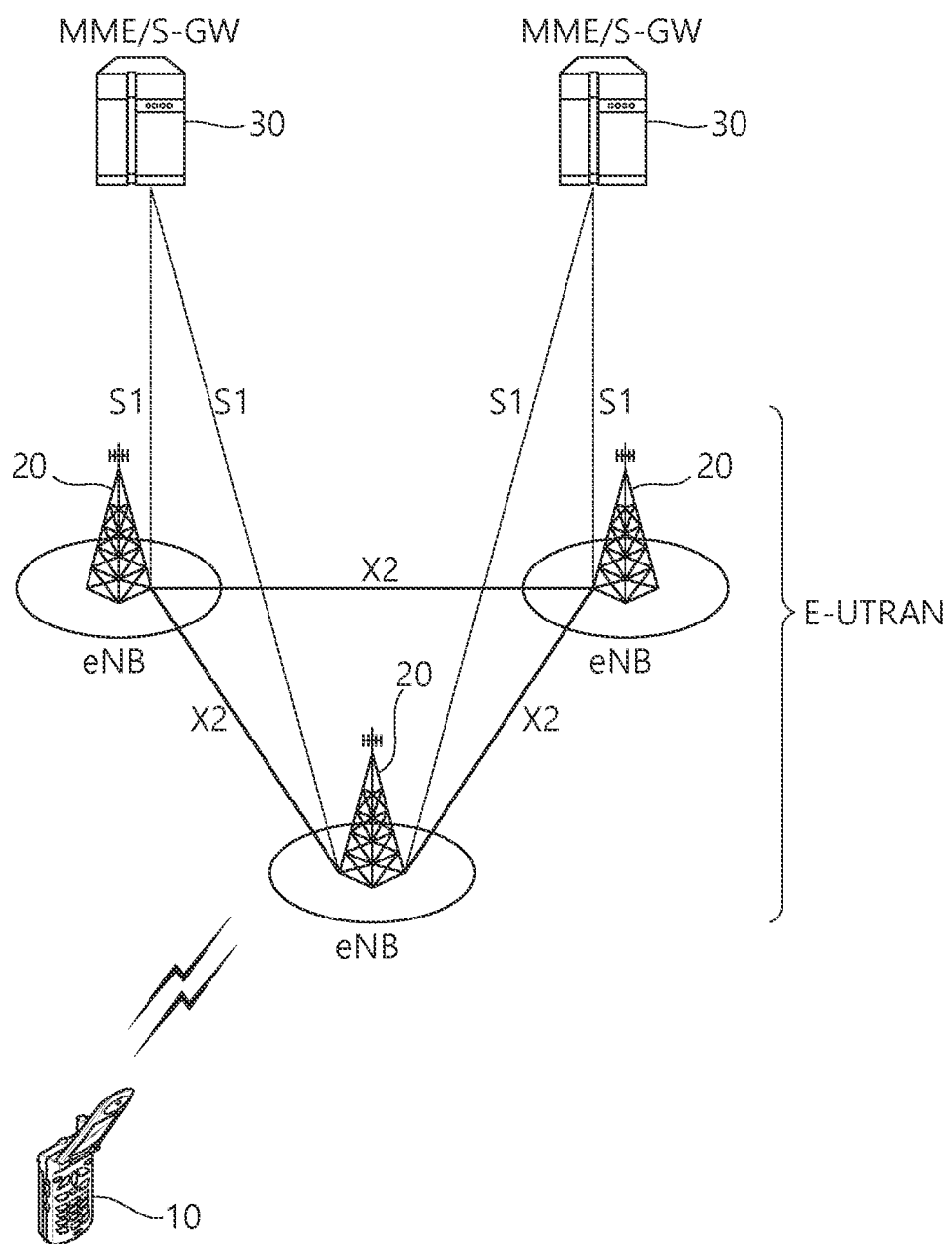
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
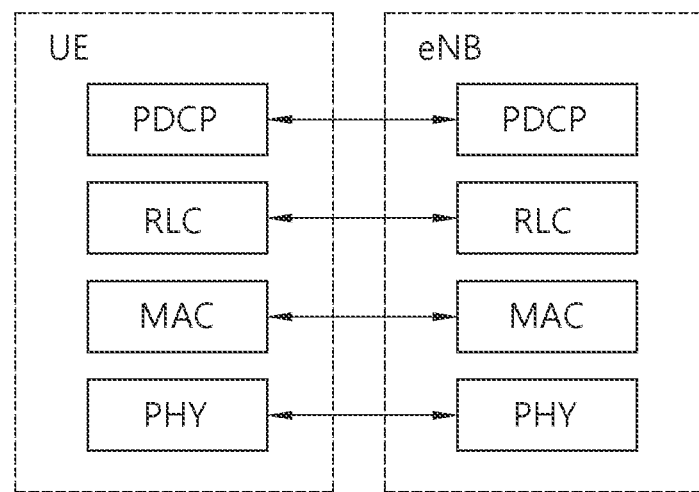
FIG. 2 is a diagram showing a wireless protocol architecture for a user plane.
Figure 3:
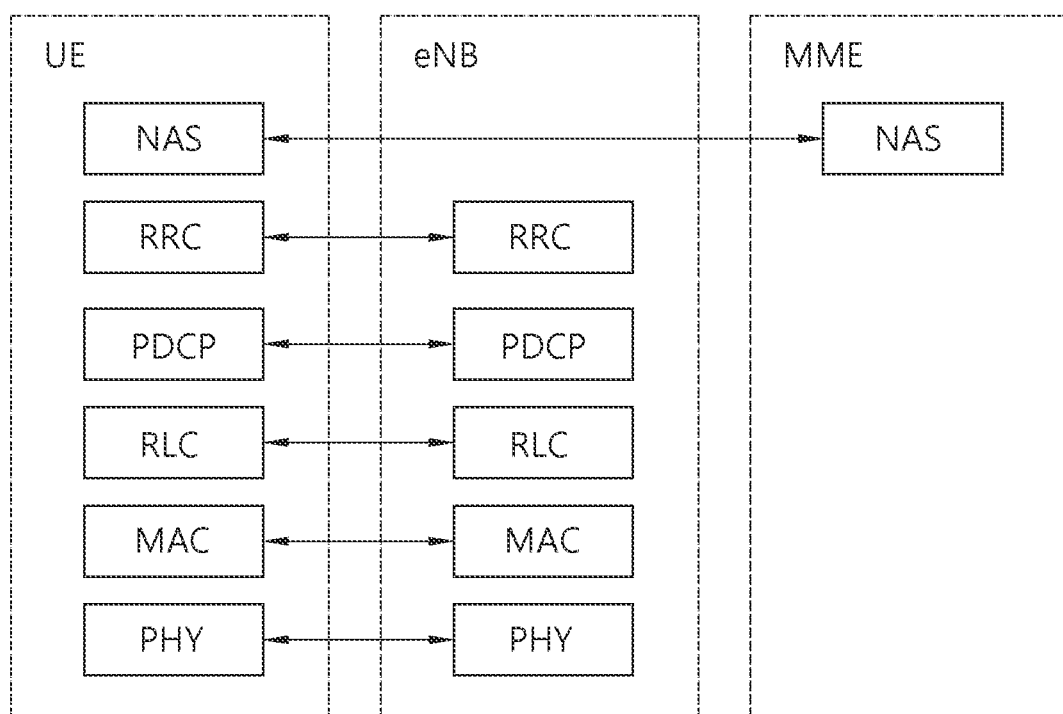
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission, e.g., a subframe or a slot.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
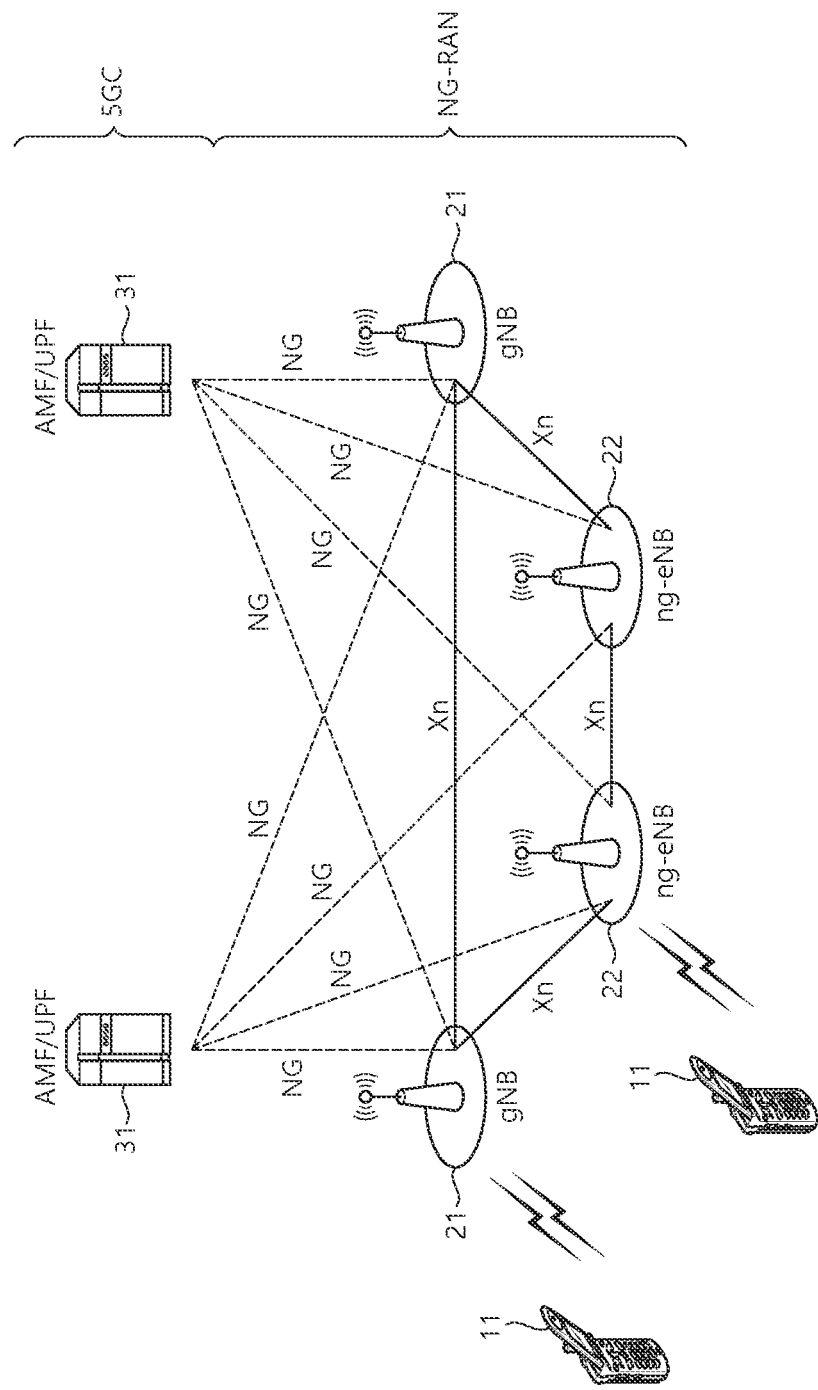
FIG. 4 shows another wireless communication system to which the present disclosure may be applied.

FIG. 4 shows another wireless communication system to which the present disclosure may be applied.

Specifically, FIG. 4 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 4, a wireless communication system includes one or more UEs 11, a next-generation RAN (NG-RAN), and a 5$^{th}$ generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

Figure 5:
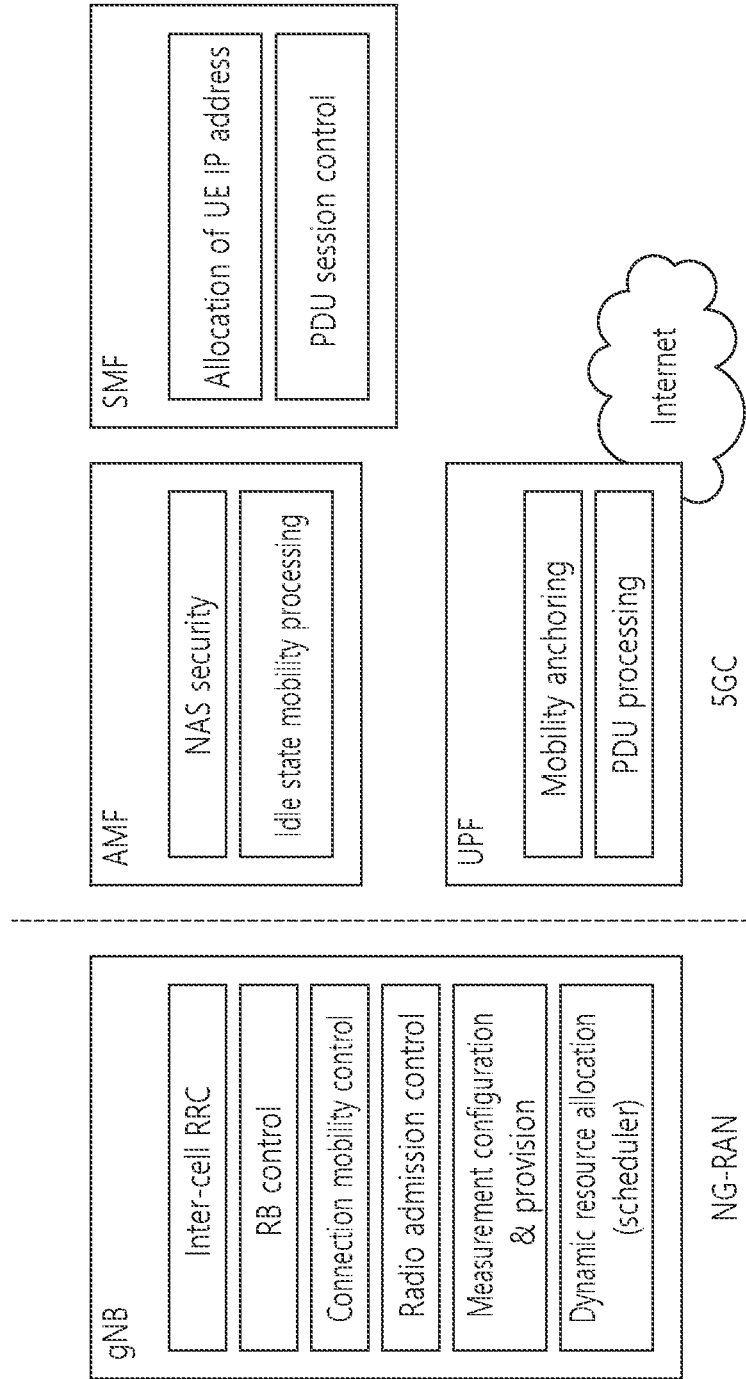
FIG. 5 illustrates a functional division between an NG-RAN and a 5GC.

FIG. 5 illustrates a functional division between an NG-RAN and a 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
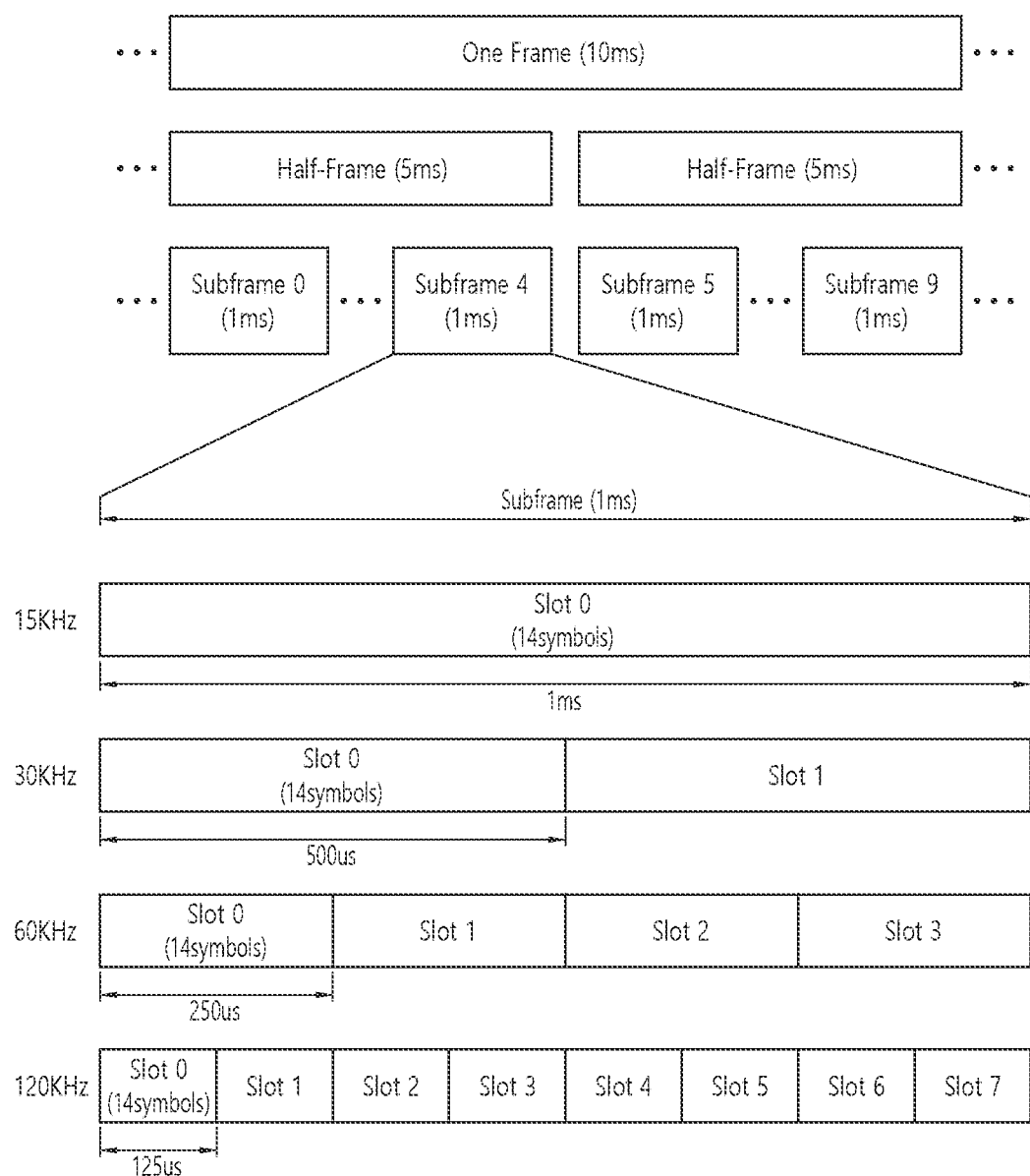
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

In the NR, uplink and downlink transmissions may be configured on a frame basis. A radio frame has a length of 10 ms, and may be defined as two 5 ms half-frames (HFs). The HF may be defined as five 1 ms sub-frames (SFs). The SF is divided into one or more slots, and the number of slots in the SF depends on a subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Herein, the symbol may include an OFDM symbol (or CP-OFDM symbol) and an SC-FDMA symbol (or DFT-S-OFDM symbol).

One or a plurality of slots may be included in a subframe according to subcarrier spacings.

The following table 1 illustrates a subcarrier spacing configuration

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |

TABLE 2-continued

| $\mu$ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

Table 3 below illustrates that the number of symbols per slot, the number of slots per frame, and the number of slots per subframe vary depending on the SCS, in case of using an extended CP.

TABLE 3

| SCS($15*2^\mu$) | $N_{symb}^{slot}$ | $N_{slot}^{frame,\mu}$ | $N_{slot}^{subframe,\mu}$ |
|---|---|---|---|
| 60 KHz ($\mu$ = 2) | 12 | 40 | 4 |

NR supports multiple numbers (or subcarrier spacing (SCS)) to support various 5G services. For example, when the SCS is 15 kHz, a wide region in the legacy cellular band is supported; and when the SCS is 30 kHz/60 kHz, dense urban areas, low time delay and wide carrier bandwidth are supported; and when the SCS is 60 kHz or more, a bandwidth of more than 24.25 GHz is supported in order to overcome phase noise.

The NR frequency band may be defined as two types of frequency ranges (FR1 and FR2). A numerical value of the frequency range may be changed and, for example, the two types of frequency ranges (FR1 and FR2) may be as shown in Table 4 below. For convenience of explanation, among the frequency ranges used in the NR system, FR1 may refer to "sub 6 GHz range" and FR2 may refer to "above 6 GHz range" and may be called millimeter wave (mmW).

TABLE 4

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range of the NR system may be changed. For example, FR1 may include a band of 410 MHz to 7125 MHz as shown in Table 5 below. That is, FR1 may include a frequency band of 6 GHz (or 5850, 5900, 5925 MHz, etc.) or higher. For example, the frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 5

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
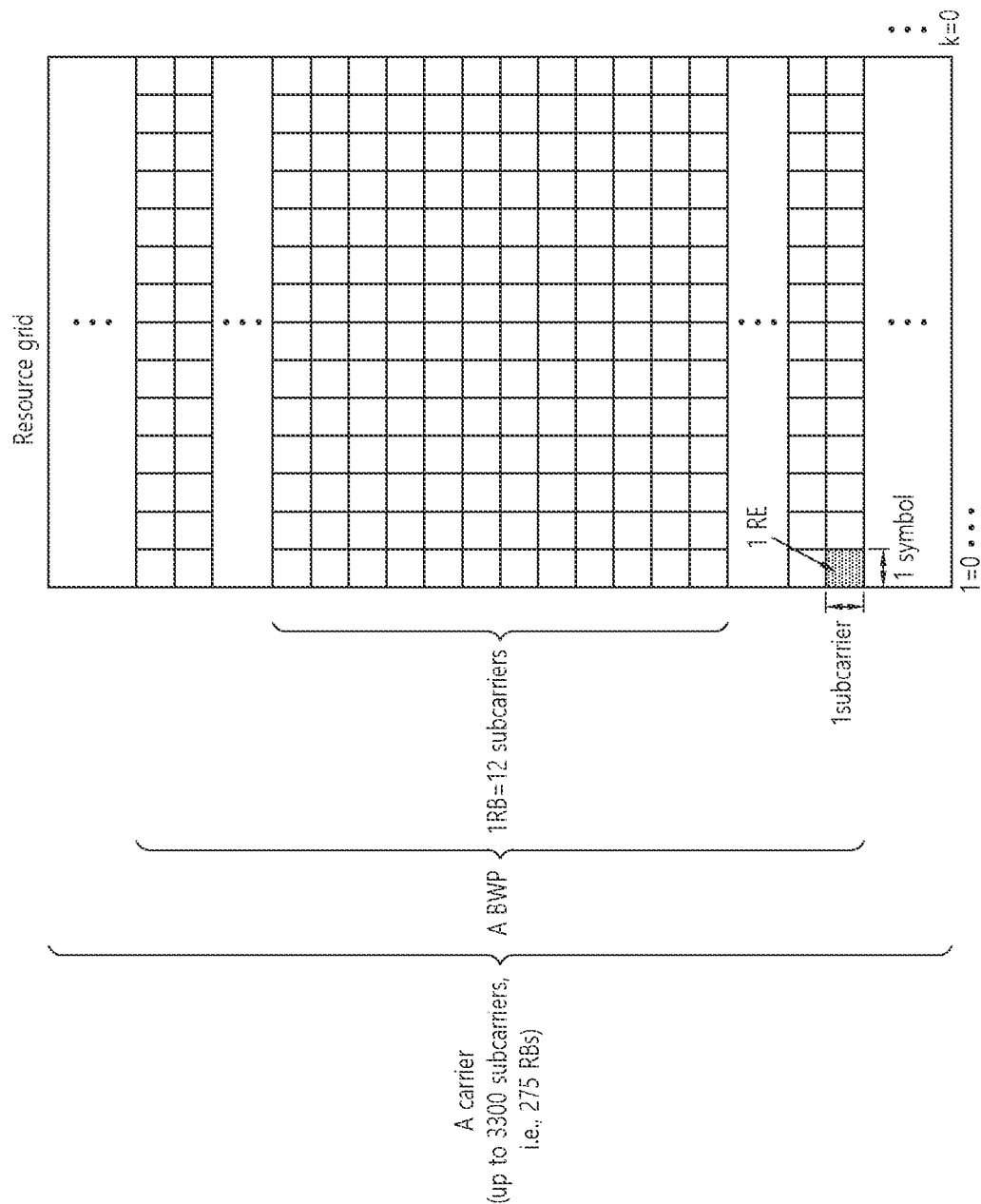
FIG. 7 illustrates a slot structure.

FIG. 7 illustrates a slot structure.

Referring to FIG. 7, a slot includes a plurality of symbols in a time domain. For example, in case of a normal CP, one slot may include 14 symbols. However, in case of an extended CP, one slot may include 12 symbols. Alternatively, in case of the normal CP, one slot may include 7 symbols. However, in case of the extended CP, one slot may include 6 symbols.

A carrier includes a plurality of subcarriers in a frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, and so on). The carrier ma include up to N (e.g., 5) BWPs. Data communication may be performed through an activated BWP. Each element may be referred to as a resource element (RE) within a resource grid, and one complex symbol may be mapped thereto.

A physical downlink control channel (PDCCH) may include one or more control channel elements (CCEs) as illustrated in the following table 6.

TABLE 6

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

A new unit called a control resource set (CORESET) may be introduced in the NR. The UE may receive a PDCCH in the CORESET.

Meanwhile, coverage enhancement (CE) regarding an uplink signal has been discussed for a physical uplink shared channel (PUSCH), a physical uplink control channel (PUCCH), and other signals. Hereinafter, PUCCH CE will be described.

A method of performing repetition for CE of PUCCH in existing NR has been considered.

The PUCCH repetition may be applied only to PUCCH formats 1, 3, and 4 (long PUCCH). In addition, as the number of repetitions of the PUCCH, three cases of nrofSlots=n2, n4, n8 (PUCCH-FormatConfig) may be considered. In the PUCCH repetition, the repeated PUCCHs have the same number of consecutive symbols and the same first symbol, and all of them may have the same position in the slot. In addition, when interslotFrequencyHopping is configured, frequency hopping may be applied to startingPRB for an even-numbered slot and secondHopPRB for an odd-numbered slot during the PUCCH repetition. In addition, the UE does not multiplex different uplink control information (UCI) types of the repeated PUCCH. Therefore, when different PUCCHs overlap in an interval within the slot, the UE transmits only one PUCCH and drops the remaining PUCCH or transmits an earlier starting PUCCH (with same priority) according to a priority rule (e.g., HARQ-ACK>SR>CSI).

The repetition of the PUCCH is performed only on a long PUCCH only at the same position in each slot only, and therefore the actual number of repetitions may be less than a set number. In particular, as mentioned above, since a special slot (S slot) includes all downlink (D), flexible (F), and uplink (U) symbols, it is difficult to perform repetition of the PUCCH, and in order to solve this problem, a next-generation PUCCH CE method (e.g., DMRS-less PUCCH, PUCCH repetition such as PUSCH repetition type B for UCI of at least 11 bits or less, explicit or implicit dynamic PUCCH repetition factor indication, DMRS bundling cross PUCCH repetitions, etc.) may be considered. PUCCH repetition transmission in the S slot through UCI split may also be considered as one method, but this has a limitation in that a gain in terms of latency reduction is higher than that of CE. As a PUCCH repetition of the new method, a method of repeatedly transmitting consecutive symbols, rather than specifying and repeating a start symbol and length in the slot like the existing PUSCH repetition type B may be considered.

Hereinafter, technical problems of DMRS bundles in PUSCH/PUCCH will be described.

Regarding coverage enhancement (CE), discussions have been made on DMRS bundles in PUSCH and PUCCH. Since a main cause of performance degradation of CE is a degradation of the channel estimation performance due to a low signal to noise ratio (SNR), a method of increasing channel estimation performance through an SNR gain by estimating channels by bundling the DMRS of the repeated PUSCH/PUCCH is considered. In the case of supporting such an operation in the 3GPP standard, a determination of a DMRS bundle size is required. If the DMRS bundle size is not defined in advance, two major problems may arise. First, when the UE transmits a DMRS bundle that is smaller than the DMRS bundle expected by a gNB, the gNB expects joint estimation in the corresponding DMRS bundle, but when the UE transmits PUSCH/PUCCH in which power, timing advance (TA), SRS, etc. are changed, the performance of a gNB receiving end may be significantly impaired. Alternatively, if the UE transmits a DMRS bundle that is always larger than the DMRS bundle indicated by the gNB, a transmission beam and frequency resource may be equally applied at a corresponding time, so interference that the gNB cannot recognize may occur.

In addition, considering a case in which a dynamic indication of repetition is introduced, the following problem may arise. There is no prior agreement on the determination of the DMRS bundle size when the UE is instructed to change the number of repetitions through a dynamic indication while transmitting the PUSCH/PUCCH according to the repetition in which the DMRS bundle is configured, and thus, an error may occur due to misunderstanding of the DMRS bundle size between the gNB and the UE.

Accordingly, the present disclosure proposes a method for determining a DMRS bundle size in a repeated PUSCH/PUCCH and a method for determining a DMRS bundle size according to a dynamically indicated number of repetitions.

Meanwhile, in the present disclosure, the term 'repetition' may refer to repeated transmission of PUCCH/PUSCH. Here, repetition may be performed continuously or may be performed at regular intervals. Also, in the present disclosure, the term 'DMRS bundle/bundling' may refer to a DMRS configured for a plurality of continuous time resources (e.g., symbols). In this case, the resources configured as the DMRS bundle may be configured to have the same channel characteristics or be included within a specific range. The channel characteristics include some or all of a transmission/reception spatial filter, indices of the spatial filters (e.g., an SRS resource indicator (SRI)), a holding time of a TA command, transmit power, a Doppler effect, and a coherence time.

As an example, in the present disclosure, when repetition is configured in units of slots, the repetition of the DMRS bundle is a DMRS configured for a plurality of consecutive symbols in the slot may refer to an operation in which the DMRS configured for a plurality of consecutive symbols in the slot, that is, the DMRS bundle, is repeatedly configured/transmitted for a plurality of slots. In this case, a position of the DMRS bundle in the slot may be the same for the slots in which repetition is performed.

Meanwhile, in the following description, a classification (index) of each method is for convenience of description, and it may be understood by those skilled in the art that each method does not necessarily have to be independently performed and a combination of a plurality of methods that do not conflict with each other may be implemented as a single method.

The DMRS bundle, which will be described later, is described with the PUSCH and PUCCH configured for repetition as a target, but may also be applied to other uplink channels and downlink channels. In addition, a DMRS bundle may be configured by methods to be described later, or a DMRS bundle may be configured by methods other than the methods described below. In this case, although the DMRS bundle is indicated, a case in which a communication device does not configure a DMRS bundle and transmits the DMRS bundle on an individual transmission occasion may occur. For these resources, the gNB will perform joint decoding in the expectation that the DMRS bundle will be configured, so if the UE transmits the DMRS bundle without satisfying a condition for transmitting the DMRS bundle, decoding performance of the gNB may be deteriorated. Thus, if the DMRS bundle is indicated (by a prior agreement) but is not transmitted or if the DMRS bundle is not configured nor transmitted, the UE may report a corresponding slot index or DMRS bundle index of the gNB.

First, a method of configuring a slot boundary for a DMRS bundle will be described.

The UE may be indicated on a slot boundary for a DMRS bundle. Here, the slot boundary for the DMRS bundle may refer to a time during which channel characteristics required/expected to be constant between DMRS bundles is changed or changed by exceeding a similarity within a specific range. The channel characteristics required/expected to be constant between DMRS bundles may include some or all of a transmission/reception spatial filter, indices of the spatial filters (e.g., an SRS resource indicator (SRI)), a holding time of a TA command, transmit power, a Doppler effect, and a coherence time. That is, the DMRS bundle may be configured in slots between the slot boundary for the DMRS bundle. The gNB may not indicate a DMRS bundle in which the slot boundary exists in this DMRS bundle. Thus, the UE may not expect DMRS bundles to be indicated across these slot boundaries. An interval of these slot boundaries may be uniformly applied and set as a period rather than a boundary. Alternatively, the interval between the slot boundaries may be set to be non-uniform, and such a slot boundary may be configured as a set of slot indices. This slot boundary may be indicated to the UE according to the implementation of the gNB by RRC/MAC-CE/DCI or the like. Alternatively, the gNB may determine/set the slot boundary by synthesizing the channel characteristics reported by the UE to the gNB, or the UE may calculate and report the slot boundary to the gNB based on the reception channel characteristics.

When such a slot boundary for a DMRS bundle is configured, the UE may not apply a transmission power control command (TPC) of uplink power control within the slot boundary. That is, the UE may ignore the TPC command received within the slot boundary for the DMRS bundle or may not apply the TPC command within the slot boundary by determining that accumulation of the TPC command is configured. In addition, the UE may perform accumulation of TPC commands transmitted within the slot boundary and apply the accumulated TPC commands after the slot boundary. For example, if the gNB configures slot indices 3 and 9 as the slot boundary for the DMRS bundle to the UE, the UE may ignore the TPC command of the PUSCH/PUCCH received at a time between slot index 3 and slot index 9 or accumulates TPC commands from slot index 3 to slot index 9 and apply the TPC commands from slot index 10.

Hereinafter, a method of configuring a DMRS bundle unit will be described.

A DMRS bundle unit may refer to consecutive slots constituting the DMRS bundle or a transmission occasion. The UE may determine that frequency hopping does not change between slots within a DMRS bundle unit. That is, existing inter-slot frequency hopping of the PUCCH may be performed according to whether the slot index is even/odd. Here, when a slot of the even index and a slot of the odd index is configured as a DMRS bundle, the UE may not perform frequency hopping. As a method of implementing this, for example, a physical resource block (PRB) for transmitting a PUCCH may be defined according to an index of a first or specific n-th slot in the DMRS bundle, and remaining slots in the DMRS bundle may be transmitted through the PRB. Alternatively, a DMRS bundle index may be assigned, and a transmitted PRB may be defined according to whether the DMRS bundle index is even/odd. For example, when a PUCCHs of slots 2 to 5 is configured as a DMRS bundle, the PUCCH transmission occasion in the DMRS bundle relationship may be equally mapped to the PRB of the PUCCH in the second slot. As another example, an index for a DMRS bundle in repetition may be defined, and a PRB may be mapped to the index.

When all consecutive slots for which repeated transmission of the DMRS bundle is configured are available to the UE, if the number of repetitions is a multiple of the DMRS bundle unit, the UE may sequentially transmit the DMRS bundle, but some or all of the consecutive slots from a point in time at which the UE is instructed to repeat may not be available to the corresponding UE due to TDD configuration or a downlink-flexible-uplink (DFU) structure or the like. Therefore, additional definition of a DMRS bundle unit is required for the repeated PUSCH/PUCCH. Accordingly, as will be described later, the DMRS bundle unit may be configured as follows according to a position of an unavailable slot in the repetition.

As an example of a DMRS bundle unit configuring method, the same DMRS bundle unit may be defined for intra repetition.

The UE may expect that the same DMRS bundle unit is configured for the repeated PUSCH/PUCCH. That is, while the UE performs repetition, the UE may determine that the DMRS bundle unit will not be changed. In this case, the UE may be configured to transmit PUSCH or PUCCH according to repetition, but a slot that is not available to the UE may exist in the repetition. In this case, the following two options may be considered as a method of determining the DMRS bundle unit.

Option 1-1) Placement of DMRS Bundle Considering Unavailable Slots

Figure 8:
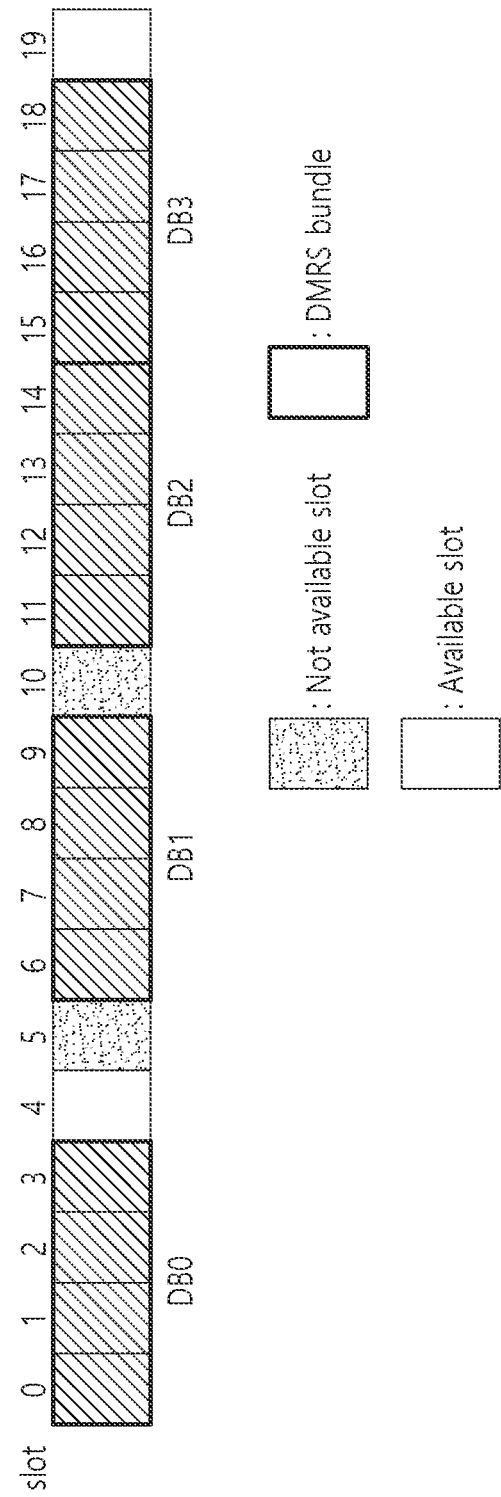
FIG. 8 shows an example to which option 1-1 is applied.

In this option, the DMRS bundle unit is configured in an ascending order of the slot index from a start slot of the repetition, and when an unavailable slot exists within the configured DMRS bundle unit, the DMRS bundle unit may be configured, starting from a slot next to the unavailable slot, that is, an available slot of the lowest slot index. FIG. 8 shows an example to which option 1-1 is applied. In FIG. 8, the hatched portion may be a region in which the UE actually performs transmission.

For convenience of description, a DMRS bundle is indicated as DB. FIG. 8 is an example of a case in which the number of repetitions is 16 and a DMRS bundle size is 4. When slot indices 5 and 10 are unavailable slots, slots having indices 0 to 3 are configured as a DMRS bundle, and since there is an unavailable slot among slots having indices 4 to 7, these slots may not be configured as a DMRS bundle. A DMRS bundle may be configured from slot 6, which is the lowest slot index 6 after the slot having index 5, and DB0, DB1, DB2, and DB3 may be configured as a DMRS bundle based on this rule.

When a DMRS bundle is configured according to the above option, slots not configured as a DMRS bundle may exist in the middle of repetition. If this set of slots is referred to as slot index x, the UE/gNB may consider or expect the following operation. First, the UE may transmit all of the DMRS bundles configured according to the above method, and may also transmit the slot index x. Transmission for the slot index x is a redundant transmission occasion transmitted by the UE in excess of the number of repetitions configured for the UE, and the UE may report the corresponding number/the corresponding transmission number to the gNB. Second, the UE may transmit only the DMRS bundle configured in the above method, and may not perform transmission for the slot index x. Third, the UE may perform transmission in slot index x and may transmit the DMRS bundle configured in the above method, but the number of all transmissions may not exceed the configured number of repetitions. That is, the UE may not transmit the last slot or transmission occasion for the last DMRS bundle. As a result, the last DMRS bundle may not be maintained. For example, in FIG. 8, x is 4 (x=4), and the UE may perform transmission for DB0, slot index 4, DB1, DB2, slot index 15, slot index 16, and slot index 17.

Option 1-2) Placement of DMRS Bundles without Considering Unavailable Slot

Figure 9:
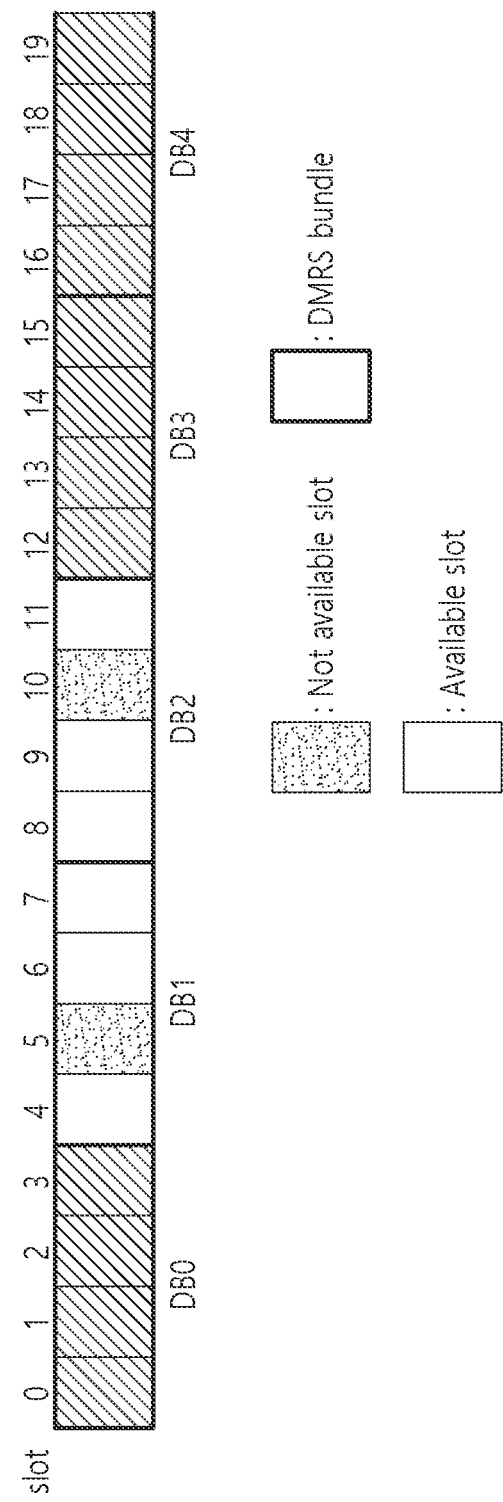
FIG. 9 shows an example to which option 1-2 is applied.

Unlike option 1-1, when a DMRS bundle is indicated to the UE for a PUSCH or PUCCH for which repetition is configured, the UE performs repetition, but the DMRS bundle may be configured only for resources that are consecutive in time or for which DMRS bundles are possible. For slots not configured as a DMRS bundle, the UE may drop transmission. Alternatively, the UE may drop only the DMRS bundle and transmit without the DMRS bundle. FIG. 9 shows an example to which option 1-2 is applied. In FIG. 9, the hatched portion may be a region in which the UE actually performs transmission.

FIG. 9 is an example in which the number of repetitions is 16 and the DMRS bundle size is 4. Regardless of an unavailable slot, the DMRS bundle unit (DB0, DB1, DB2, DB3, and DB4) may be configured, and the UE may transmit DB0, DB3, and DB4, and transmit up to configured DB5 for subsequent slots in the same manner. Or, the UE may transmit PUSCH or PUCCH for DB0, slot index 4, slot index 6, slot index 7, slot index 8, slot index 9, slot index 11 (all transmitted without a DMRS bundle), DB3, slot index 16, slot index 17.

As another example of the DMRS bundle unit configuring method, different DMRS bundle units may be defined for intra repetition.

Unlike the method described above, the UE may expect that the DMRS bundle unit is not identically configured for the PUSCH/PUCCH on which repetition is performed. That is, the DMRS bundle unit may be changed during repetition. The UE is configured to transmit PUSCH or PUCCH according to the repetition, but an unavailable slot may exist in the repetition. In this case, the following options may be considered as a method of configuring the DMRS bundle unit.

Figure 10:
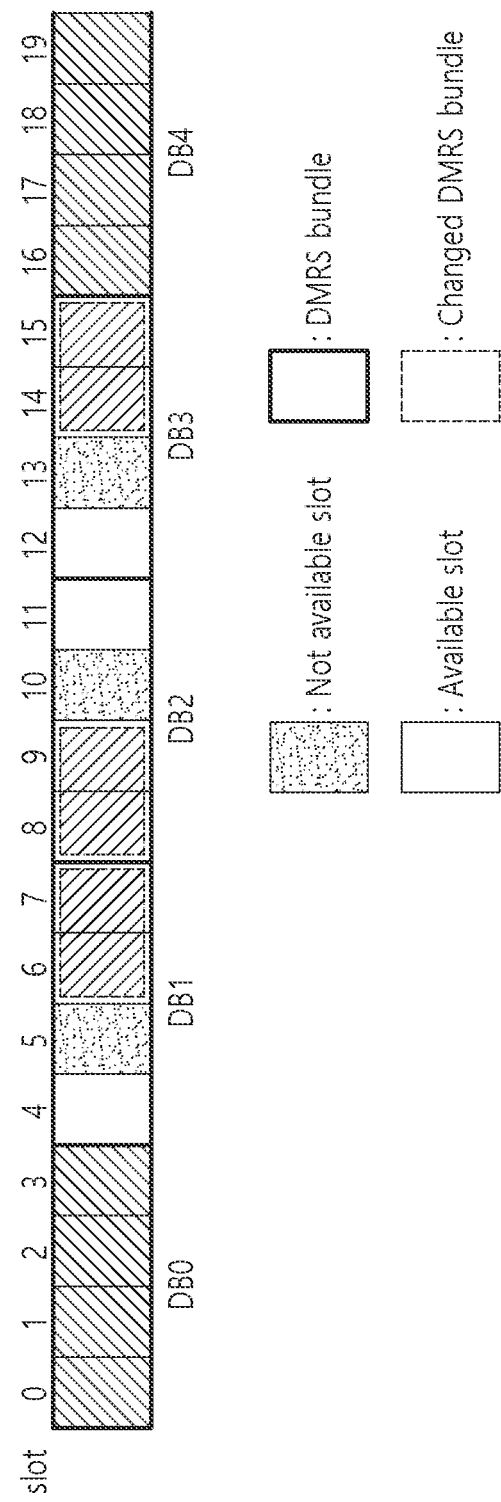
FIG. 10 is an example of a case in which a DMRS bundle is configured by the method of option 1-2, the number of repetitions is 16, and the configured DMRS bundle size is 4.

Option 2-1) Regarding a configured DMRS bundle, a DMRS bundle size smaller than a DMRS bundle configured within the previously configured DMRS bundle may be configured for a bundle including an unavailable slot. As a method for configuring the DMRS bundle, both the previously proposed options 1-1 and 1-2 may be considered, and the method of configuring the DMRS bundle changed for the configured DMRS bundle, which will be described later, may be equally applied to option 1-1 and option 1-2. FIG. 10 is an example of a case in which a DMRS bundle is configured by the method of option 1-2, the number of repetitions is 16, and the configured DMRS bundle size is 4. In FIG. 10, the hatched portion may be a region in which the UE actually performs transmission.

Referring to FIG. 10, in a case in which unavailable slots are slot indices 5, 10, and 13, when a DMRS bundle is configured based on option 1-2, DB0 and DB4 may be configured, and since DB1, DB2, and DB3 include unavailable slots, these slots may not be transmitted as a DMRS bundle. For these slots, a DMRS bundle having a size 2, which is smaller than the configured DMRS bundle size of 4, may be disposed without invading a boundary of the previously configured DMRS bundle, that is, within DB1 (slot indices 4 to 7), DB2 (slot indices 8 to 11).), and DB3 (slot indices 12 to 15). That is, slot indices 6 and 7, slot indices 8 and 9, and slot indices 14 and 15 may be configured as changed DMRS bundles having a size 2, and DMRS bundles having two sizes may be transmitted in repetition.

The method may be applied sequentially. That is, if the size of the configured DMRS bundle is $2^n$, a changed DMRS bundle having a size of $2^{(n-1)}$ may be disposed, and then, a changed DMRS bundle having a smaller size of $2^{(n-2)}, \ldots, 2$ may be disposed.

Figure 11:
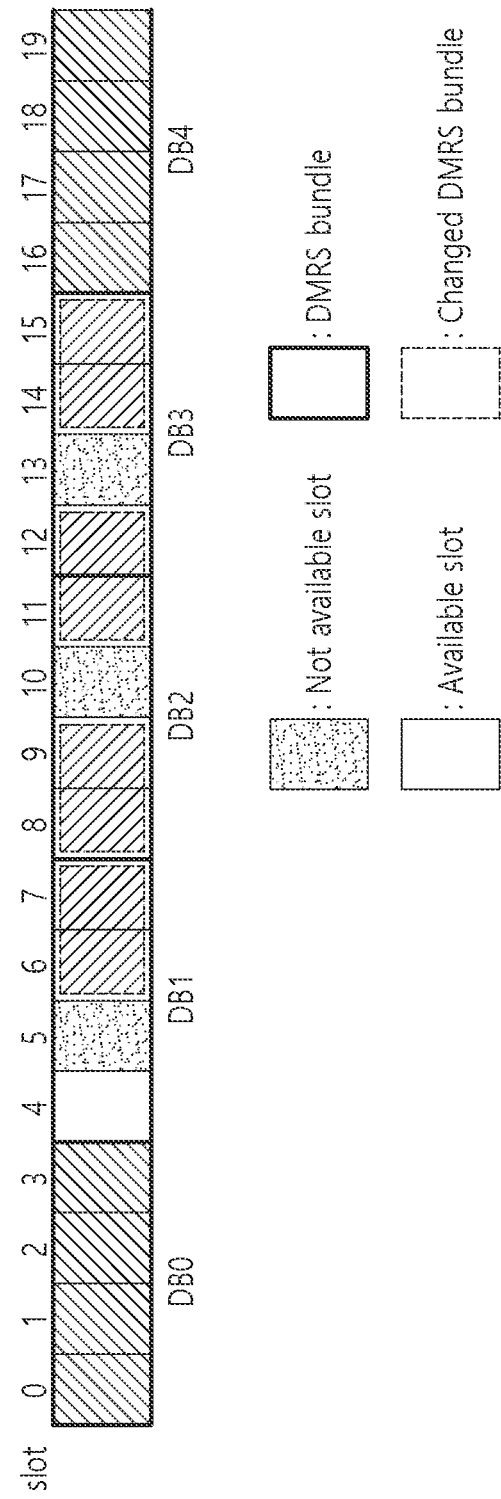
FIG. 11 is an example of a case in which a DMRS bundle is configured by the method of option 1-2, the number of repetitions is 16, and a configured DMRS bundle size is 4.

Option 2-2) Regarding a bundle including an unavailable slot among the configured DMRS bundles, a DMRS bundle size smaller than the configured DMRS bundle may be configured without considering a boundary of the previously configured DMRS bundle. As a DMRS bundle configuration method, both options 1-1 and 1-2 may be considered, and the DMRS bundle configuration method changed for the configured DMRS bundle described later may be equally applied to options 1-1 and 1-2. FIG. 11 is an example of a case in which a DMRS bundle is configured by the method of option 1-2, the number of repetitions is 16, and a configured DMRS bundle size is 4. In FIG. 11, the hatched portion may be a region in which the UE actually performs transmission.

Referring to FIG. 10, in a case in which unavailable slots are slot indices 5, 10, and 13, when a DMRS bundle is configured based on option 1-2, DB0 and DB4 may be configured, and since DB1, DB2, and DB3 include unavailable slots, they may not be transmitted as a DMRS bundle. For these slots, a DMRS bundle having a size 2 smaller than the configured DMRS bundle size of 4 may be disposed, ignoring the boundary of the previously configured DMRS bundle. That is, slot indices 6 and 7, slot indices 8 and 9, slot indices 11 and 12, and slot indices 14 and 15 may be configured as changed DMRS bundles having a size 2, and DMRS bundles having two sizes may be transmitted in the repetition.

Similar to option 2-1, the method may be applied sequentially. That is, if the size of the configured DMRS bundle is $2^n$, a changed DMRS bundle having a size of $2^{(n-1)}$ may be disposed, and then, a changed DMRS bundle having a smaller size of $2^{(n-1)}, \ldots, 2$ may be disposed.

Hereinafter, a DMRS bundle having dynamic indication of repetition is described.

Dynamic indication of PUSCH/PUCCH repetition may be introduced. The dynamic indication of repetition may be an indication of on-off of repetition itself, that is, an indication of whether to perform or an indication of a change in the number of repetitions. Therefore, if the dynamic indication of DMRS bundle and repetition is introduced, the following situation may occur. If more or fewer repetitions are configured while performing the indicated repetitions according to the preset DMRS bundle size, ambiguity may occur as to how the UE adjusts the DMRS bundle size. Therefore, the DMRS bundle size may be configured together according to the dynamic indication method of repetition. However, as a dynamic indication method of repetition, a method of explicitly indicating with DCI or a method of indicating implicitly by mapping to a PUCCH resource indicator (PRI) has been considered. When indicated by DCI, a reserved bit in the current DCI may be used, and since these resources are not sufficient, the DMRS bundle size may not be indicated even if the number of repetitions is changed. Even in the case of implicitly indicating by PRI, etc., mapping of (the number of configurable repetitions)*(the number of DMRS bundle sizes) is required when the DMRS bundle size is taken into consideration, so mapping considering all of them may be difficult. Accordingly, it may be desirable to change the DMRS bundle size according to a change in the number of repetitions according to a prior appointment/agreement.

Therefore, regarding an operation of the UE when the number of repetitions is changed by the dynamic indication for repetition, a method independent of the number of repetitions indicated by the dynamic indication and a method of considering a change in the DRMS bundle size depending on the number of repetitions indicated by the dynamic indication method may be considered.

First, a method in which the same DMRS bundle size is maintained regardless of the presence or absence of dynamic indication of repetition may be considered.

The method is a method in which the DMRS bundle size is configured independently of the changed number of repetitions when the number of repetitions is changed by a dynamic indication. The following options may be considered for the method.

Option 3.1-1) the DMRS Bundle Size is Always Maintained Regardless of Dynamic Indication of Repetition Even if the number of repetitions is changed by dynamic indication, the UE may maintain the size of the DMRS bundle that has been previously configured or transmitted. In this case, option 1-1 and/or option 1-2 may be applied based on the arrangement of the unavailable and available slots for the transmission occasion in which the UE should transmit according to the changed number of repetitions. In addition, in the case described above, option 2-1 and/or option 2-2 may be applied. Alternatively, the UE may transmit only DMRS bundles configured in time order, and may drop transmission for resources for which DMRS bundles are not possible or transmit without a DMRS bundle.

Option 3.1-2) DMRS Bundle is Stopped if the Number of Repetitions is Changed by Dynamic Indication of the Repetition When the number of repetitions is changed by dynamic indication, the UE may stop the DMRS bundle. That is, when the number of repetitions is changed through the dynamic indication, the UE may determine that it is instructed not to perform transmission based on the DMRS bundle. Stopping of the DMRS bundle may be transmission of all repetitions without a DMRS bundle from a time point at which the dynamic indication is received or transmission by performing the DMRS bundle until a preset repetition and transmission without a DMRS bundle for a corresponding additional transmission when the number of repetitions is increased by the dynamic indication.

Next, a method of configuring the DMRS bundle size mapped to the number of repetitions may be considered.

The number of repetitions and the DMRS bundle may be mapped. That is, the number of repetitions and the DMRS bundle size may correspond to 1:1 or 1:n. For example, when a DMRS bundle is indicated in a PUSCH/PUCCH in which $2^N$ repetitions are configured, the UE may determine that the size of the DMRS bundle is $2^{(N-k)}$ by prior agreement. Here, k may be a single value. Alternatively, k may be a value indicated through an indication of a DMRS bundle among a plurality of candidates. Alternatively, a mapping relationship between the DMRS bundle and the number of repetitions may be defined by prior agreement. In all cases, as in option 3.2-1 and option 3.2-1, whether the number of repetitions and the DMRS bundle size is 1:1 mapping or 1:N mapping may be distinguished.

Option 3.2-1) 1:1 Mapping of Number of Iterations to DMRS Bundle Size

When the number of repetitions and the DMRS bundle size have a 1:1 mapping relationship, that is, every number of repetitions may have a unique DMRS bundle size. In this case, when a change in the number of repetitions is indicated by a dynamic indication, there may exist a case in which the number of repetitions is configured to be larger than the present and a case in which the number of repetitions is configured to be smaller than the present.

Case 1) when the Number of Repetitions is Set to be Smaller than the Present by Dynamic Indication In this case, the UE may determine that a change in the DMRS bundle size mapped to the changed number of repetitions is indicated. This change in the size of the DMRS bundle may be applied from the next slot of the slot in which the DMRS bundle is configured at the time of receiving the dynamic indication. Alternatively, if a change in the DMRS bundle size is applicable to the DMRS bundle currently being transmitted at the same time as the dynamic indication according to capability of the UE, the UE may change the size of the DMRS bundle from the corresponding DMRS bundle. For example, when the existing DMRS bundle size is 4, the DMRS bundle is configured for slot indices 1, 2, 3, and 4, and a decrease in the number of repetitions is indicated in the slot having an index 2 is indicated while the UE transmits the DMRS bundle, the UE may determine that it is instructed to change the DMRS bundle size to 2 according to the mapping relationship. In this case, the UE may not transmit slot indices 1 and 2 and slot indices 3 and 4 in one DMRS bundle.

Alternatively, the UE may maintain the DMRS bundle size without changing the number of repetitions indicated by the dynamic indication. Alternatively, the UE may not perform the DMRS bundle at the same time as the dynamic indication. In addition, the UE may drop all DMRS bundles when the number of repetitions indicated by the dynamic indication is set to be smaller than the current DMRS bundle size.

Case 2) when the Number of Repetitions is Set to be Greater than the Present by Dynamic Indication In this case, the UE may change the DMRS bundle to a DMRS bundle size that is mapped to a changed number of repetitions according to a prior mapping relationship. This change in the DMRS bundle size may be applied from a time the dynamic indication is received. In addition, the UE may apply an unchanged DMRS bundle to the repetition before being changed by the dynamic indication, and may change the DMRS bundle size for subsequent transmission.

Alternatively, the UE may determine that the dynamic indication does not indicate the DMRS bundle, and may not perform the DMRS bundle for the changed number of repetitions.

Option 3.2-2) 1:N Mapping of Number of Repetitions and DMRS Bundle Size

When the number of repetitions and the size of the DMRS bundle have a 1:N mapping relationship, that is, all repetitions may have one or more DMRS bundle sizes. In this case, the DMRS bundle size may be indicated with a change in the number of repetitions or individually by a dynamic indication, and the UE may change the DMRS bundle size according to the indication. As in the case of option 3.2-1 above, when a change in the number of repetitions is indicated by a dynamic indication, there may be two cases in which the number of repetitions is set to be larger or smaller than the present. At this time, the UE may operate in the same manner as in option 3.1-2 above for each case, and may change the DMRS bundle size based on an indicated DMRS bundle size without expecting/determining through a change in the number of repetitions.

Based on the proposed methods described above, methods performed by a UE in a wireless communication system are described below.

Figure 12:
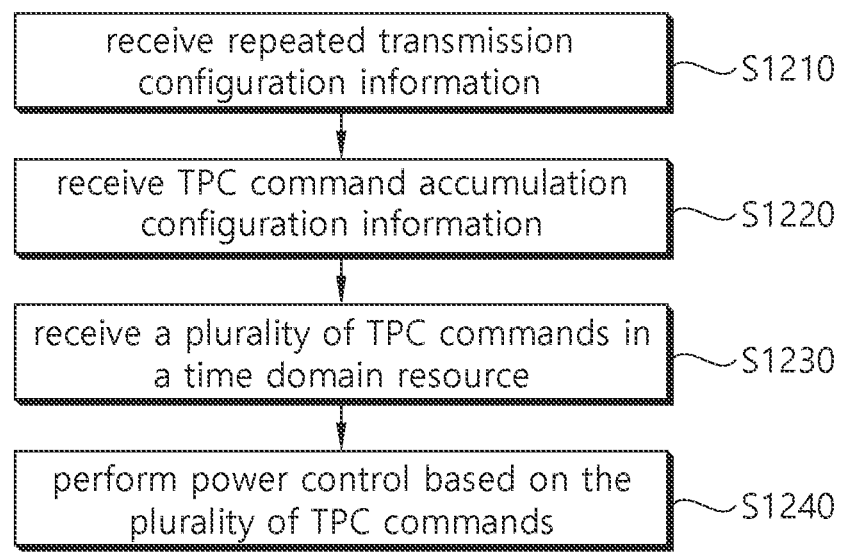
FIG. 12 is a flowchart of an example of a power control method performed by a UE according to some implementations of the present disclosure.

FIG. 12 is a flowchart of an example of a power control method performed by a UE according to some implementations of the present disclosure.

Referring to FIG. 12, the UE receives repeated transmission configuration information (S1210). The repeated transmission configuration information may be information for configuring repeated transmission for a physical uplink channel to the UE. The repeated transmission configuration information may inform a time domain resource in which the repeated transmission is performed. In addition, the UE receives TPC command accumulation configuration information (S1220). The TPC command accumulation configuration information may be information for configuring the accumulation of TPC commands to the UE.

The UE receives a plurality of TPC commands in a time domain resource (S1230). The UE performs power control based on the plurality of TPC commands (S1240). Here, the UE may perform accumulation on the plurality of TPC commands based on the TPC command accumulation configuration information. Also, the UE may apply the plurality of TPC commands after the time domain resource.

Figure 13:
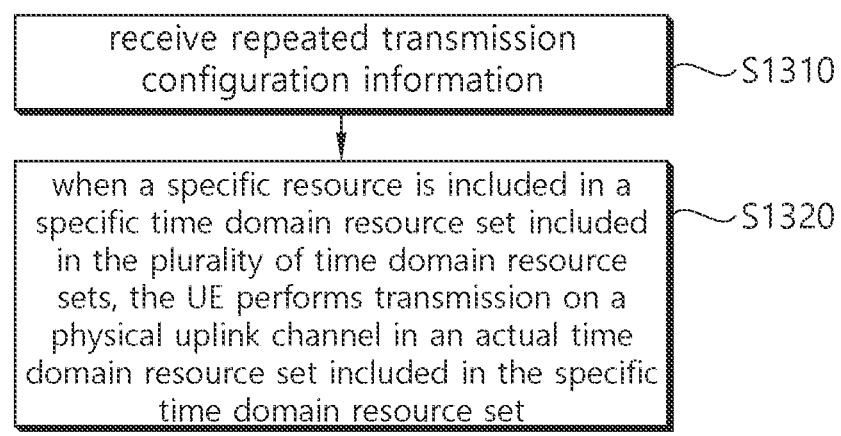
FIG. 13 is a flowchart of an example of an uplink transmission method performed by a UE according to some implementations of the present disclosure.

FIG. 13 is a flowchart of an example of an uplink transmission method performed by a UE according to some implementations of the present disclosure.

Referring to FIG. 13, the UE receives repeated transmission configuration information (S1310). The repeated transmission configuration information may be information for configuring repeated transmission for a physical uplink channel to the UE. The repeated transmission configuration information may inform a plurality of time domain resource sets in which the repeated transmission is performed. Each of the plurality of time domain resource sets may be repeatedly configured in the time domain based on the repeated transmission configuration information.

When a specific resource is included in a specific time domain resource set included in the plurality of time domain resource sets, the UE performs transmission on a physical uplink channel in an actual time domain resource set included in the specific time domain resource set (S1320). The physical uplink channel may be at least one of PUCCH and PUSCH.

Here, the specific resource may be a resource that the UE cannot use. Alternatively, the specific resource may be a resource in which an event occurs. The event may be defined in advance. The event may be an operation of determining that the channel characteristic cannot be maintained. For example, timing adjustment based on a timing advance (TA) command may be defined as the event.

In addition, the actual time domain resource set may start from a resource (e.g., a symbol) immediately after the specific resource in the time domain. The actual time domain resource set may be terminated at the last resource configured as the specific time domain resource set in the time domain. Alternatively, the actual time domain resource set may be terminated at a resource immediately before another specific resource among resources configured as the specific time domain resource set in the time domain.

Here, as an example, the plurality of time domain resource sets may be configured for transmission of a DMRS bundle. Resources configured as a DMRS bundle may be configured to have the same channel characteristics or be included within a specific range. The channel characteristics may be some or all of a transmission/reception spatial filter, indices of the spatial filters (e.g., an SRS resource indicator (SRI)), a holding time of a TA command, transmit power, a Doppler effect, and a coherence time.

The channel characteristics of a DMRS bundle transmitted in one resource domain set included in a plurality of time domain resource sets may be the same as for resources included in the one resource region set or may be included within a specific range. Alternatively, the channel characteristics of a DMRS bundle transmitted in a plurality of time domain resource sets may be the same as for resources included in the plurality of resource domain sets or may be included within a specific range. In this case, the resources included in the plurality of resource domain sets may include the actual time domain resource set.

Figure 14:
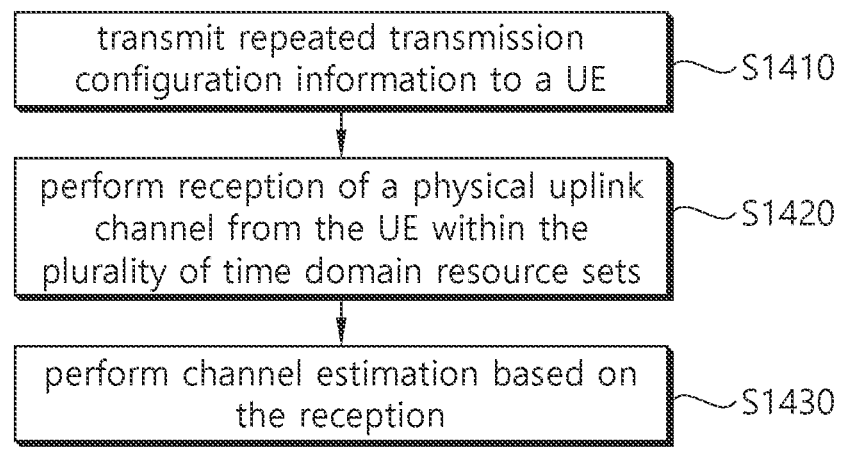
FIG. 14 is a flowchart of an example of an uplink reception method performed by a base station according to some implementations of the present disclosure.

FIG. 14 is a flowchart of an example of an uplink reception method performed by a base station according to some implementations of the present disclosure.

Referring to FIG. 14, a base station transmits repeated transmission configuration information to a UE (S1410). The repeated transmission configuration information may be information for configuring repeated transmission for a physical uplink channel to the UE. The repeated transmission configuration information may inform a plurality of time domain resource sets in which the repeated transmission is performed. Each of the plurality of time domain resource sets may be repeatedly configured in the time domain based on the repeated transmission configuration information.

Here, as an example, the plurality of time domain resource sets may be configured for transmission of a DMRS bundle. Resources configured as a DMRS bundle may be configured to have the same channel characteristics or be included within a specific range. The channel characteristics may be some or all of a transmission/reception spatial filter, indices of spatial filters (e.g., an SRS resource indicator (SRI)), a holding time of a TA command, transmit power, a Doppler effect, and a coherence time. That is, the channel characteristics of a DMRS bundle transmitted in one resource region set included in a plurality of time domain resource sets may be the same as for resources included in the one resource region set or may be included within a specific range. Alternatively, the channel characteristics of a DMRS bundle transmitted in a plurality of time domain resource sets may be the same as for resources included in the plurality of resource domain sets or may be included within a specific range.

The base station performs reception of a physical uplink channel from the UE within the plurality of time domain resource sets (S1420). When a specific resource is included in a specific time domain resource set included in the plurality of time domain resource sets, the UE may perform transmission on a physical uplink channel in an actual time domain resource set included in the specific time domain resource set. The physical uplink channel may be at least one of PUCCH and PUSCH.

Here, the specific resource may be a resource that the UE cannot use. Alternatively, the specific resource may be a resource in which an event occurs. The event may be defined in advance. The event may be an operation of determining that the channel characteristics cannot be maintained. For example, timing adjustment based on a timing advance (TA) command may be defined as the event.

In addition, the actual time domain resource set may start from a resource (e.g., a symbol) immediately after the specific resource in the time domain. The actual time domain resource set may be terminated at the last resource set as the specific time domain resource set in the time domain. Alternatively, the actual time domain resource set may be terminated at a resource immediately before another specific resource among resources set as the specific time domain resource set in the time domain.

The base station performs channel estimation based on the reception (S1430). Through this, channel estimation efficiency may be increased.

The methods proposed in the present disclosure may also be performed by an apparatus configured to control a terminal and including at least one computer-readable recording medium including an instruction based on execution by at least one processor, one or more processors, and one or more memories connected to be operable by the one or more processors and storing instructions, wherein the one or more processors execute the instructions to perform the methods proposed herein. Also, it is obvious that, according to the methods proposed in this disclosure, an operation by the base station corresponding to the operation performed by the UE may be considered.

Hereinafter, an example of a communication system to which the disclosure is applied is described.

Various descriptions, functions, procedures, proposals, methods, and/or operational flowcharts disclosed herein may be applied to, but not limited to, various fields requiring wireless communication/connection (e.g., 5G) between devices.

Hereinafter, specific examples are illustrated with reference to drawings. In the following drawings/description, unless otherwise indicated, like reference numerals may refer to like or corresponding hardware blocks, software blocks, or functional blocks.

Figure 15:
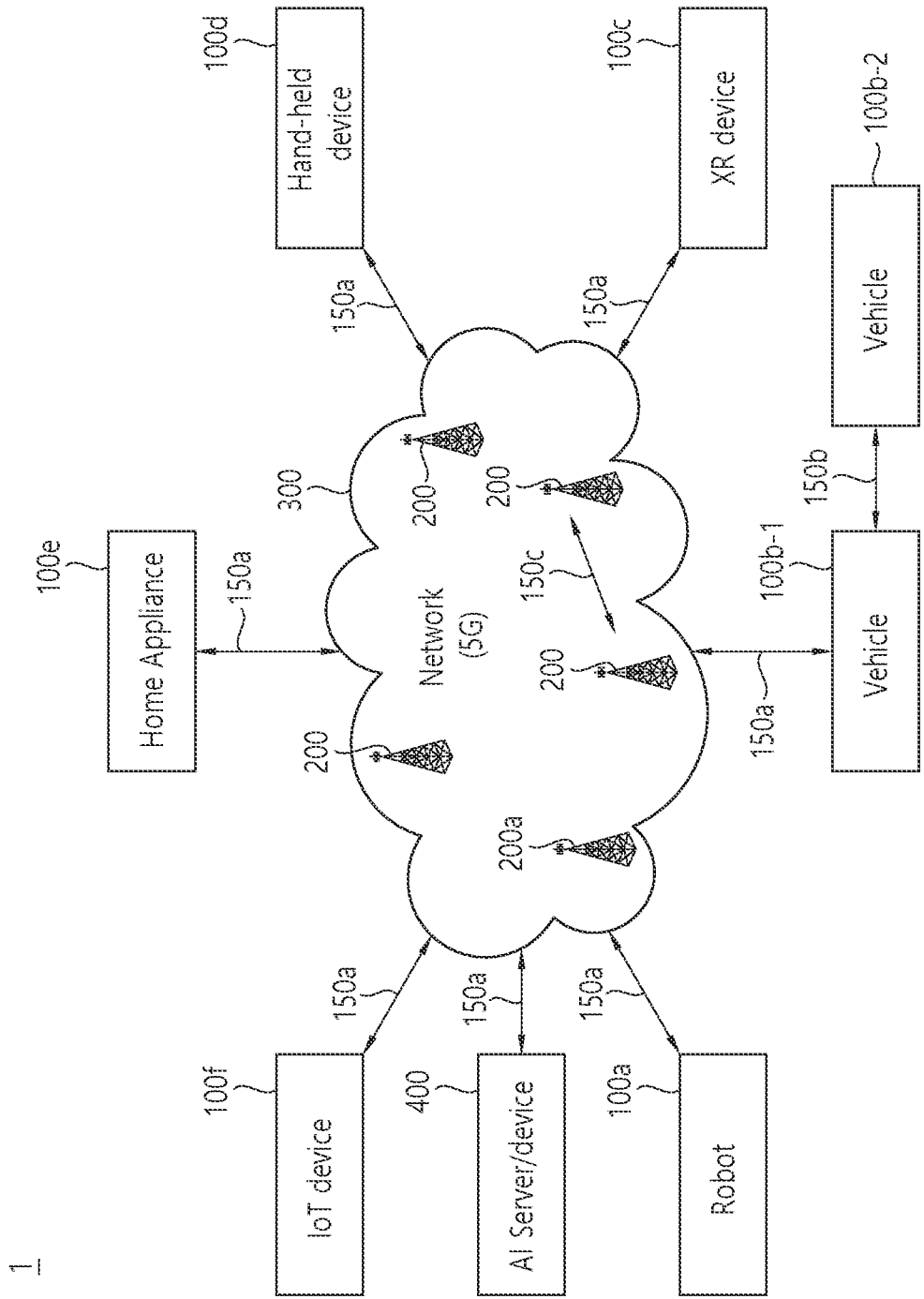
FIG. 15 illustrates a communication system 1 applied to the disclosure.

FIG. 15 illustrates a communication system 1 applied to the disclosure.

Referring to FIG. 15, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee, Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Figure 16:
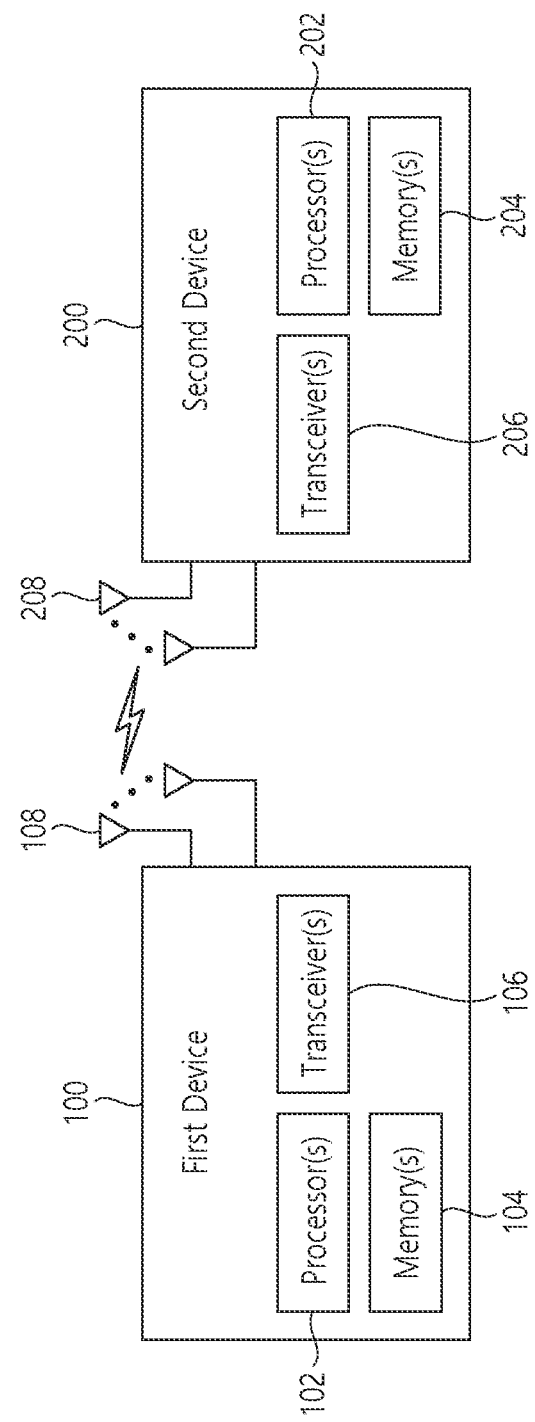
FIG. 16 illustrates a wireless device that is applicable to the disclosure.

FIG. 16 illustrates a wireless device that is applicable to the disclosure.

Referring to FIG. 16, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 15 and/or may respectively correspond to a wireless device 100x and a wireless device 100x of FIG. 15.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 17:
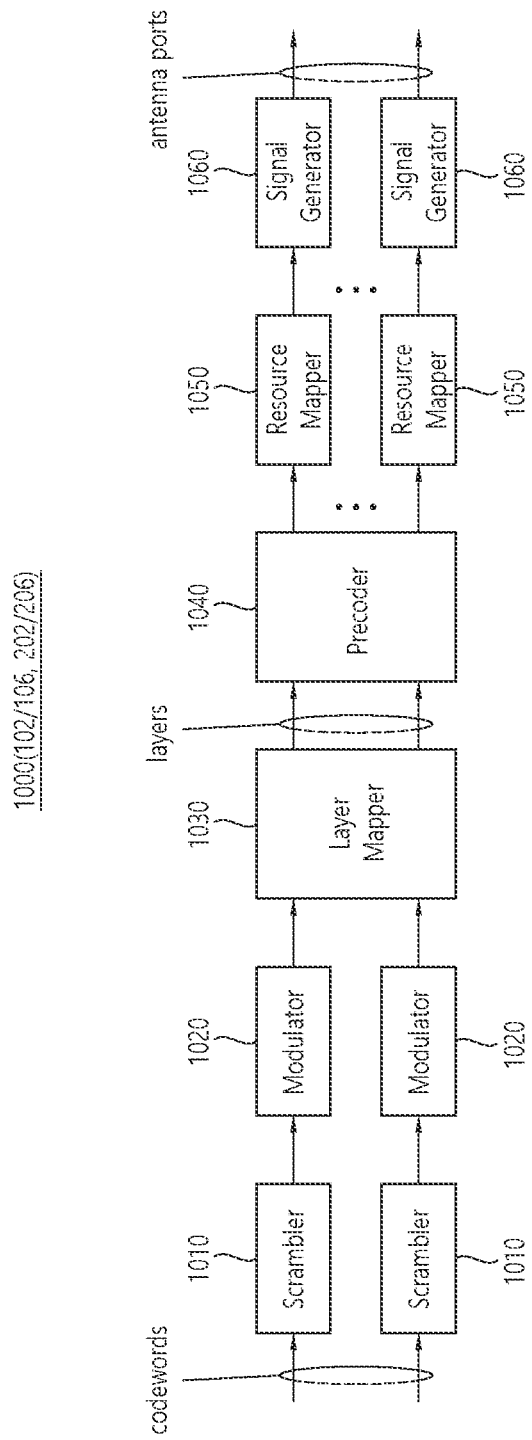
FIG. 17 illustrates a signal processing circuit for a transmission signal.

FIG. 17 illustrates a signal processing circuit for a transmission signal.

Referring to FIG. 17, the signal processing circuit 1000 may include a scrambler 1010, a modulator 1020, a layer mapper 1030, a precoder 1040, a resource mapper 1050, and a signal generator 1060. Operations/functions illustrated with reference to FIG. 17 may be performed, but not limited to, in the processor 102 and 202 and/or the transceiver 106 and 206 of FIG. 16.

Hardware elements illustrated in FIG. 17 may be configured in the processor 102 and 202 and/or the transceiver 106 and 206 of FIG. 16. For example, blocks 1010 to 1060 may be configured in the processor 102 and 202 of FIG. 16. Alternatively, blocks 1010 to 1050 may be configured in the processor 102 and 202 of FIG. 16, and a block 1060 may be configured in the transceiver 106 and 206 of FIG. 16.

A codeword may be converted into a radio signal via the signal processing circuit 1000 of FIG. 17. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 17. For example, a wireless device (e.g., 100 and 200 of FIG. 16) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Figure 18:
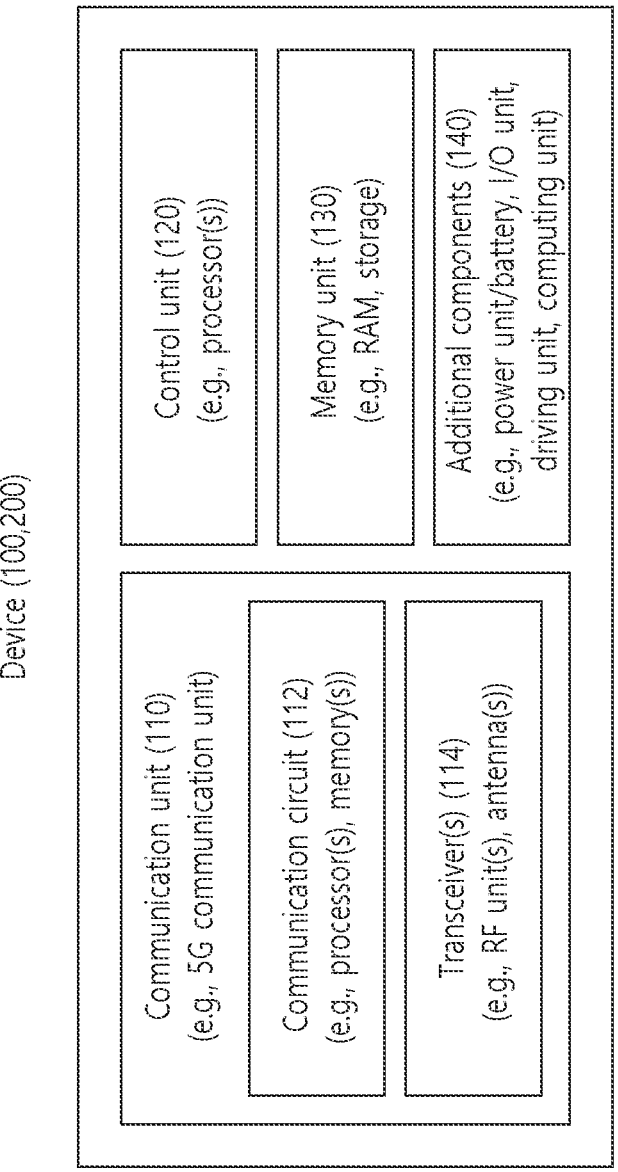
FIG. 18 illustrates another example of a wireless device applied to the disclosure.

FIG. 18 illustrates another example of a wireless device applied to the disclosure. The wireless device may be configured in various forms depending on usage/service.

Referring to FIG. 18, the wireless devices 100 and 200 may correspond to the wireless device 100 and 200 of FIG. 16 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 16. For example, the transceiver(s) 114 may include the at least one transceiver 106 and 206 and/or the at least one antenna 108 and 208 of FIG. 16. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 15), a vehicle (100 b-1 or 100 b-2 in FIG. 15), an XR device (100 c in FIG. 15), a hand-held device (100 d in FIG. 15), a home appliance (100e in FIG. 15), an IoT device (100f in FIG. 15), a terminal for digital broadcasting, a hologram device, a public safety device, an MTC device, a medical device, a fintech device (or financial device), a security device, a climate/environmental device, an AI server/device (400 in FIG. 15), a base station (200 in FIG. 15), a network node, or the like. The wireless device may be mobile or may be used in a fixed place depending on usage/service.

In FIG. 18, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 18 is described in detail with reference to the accompanying drawing.

Figure 19:
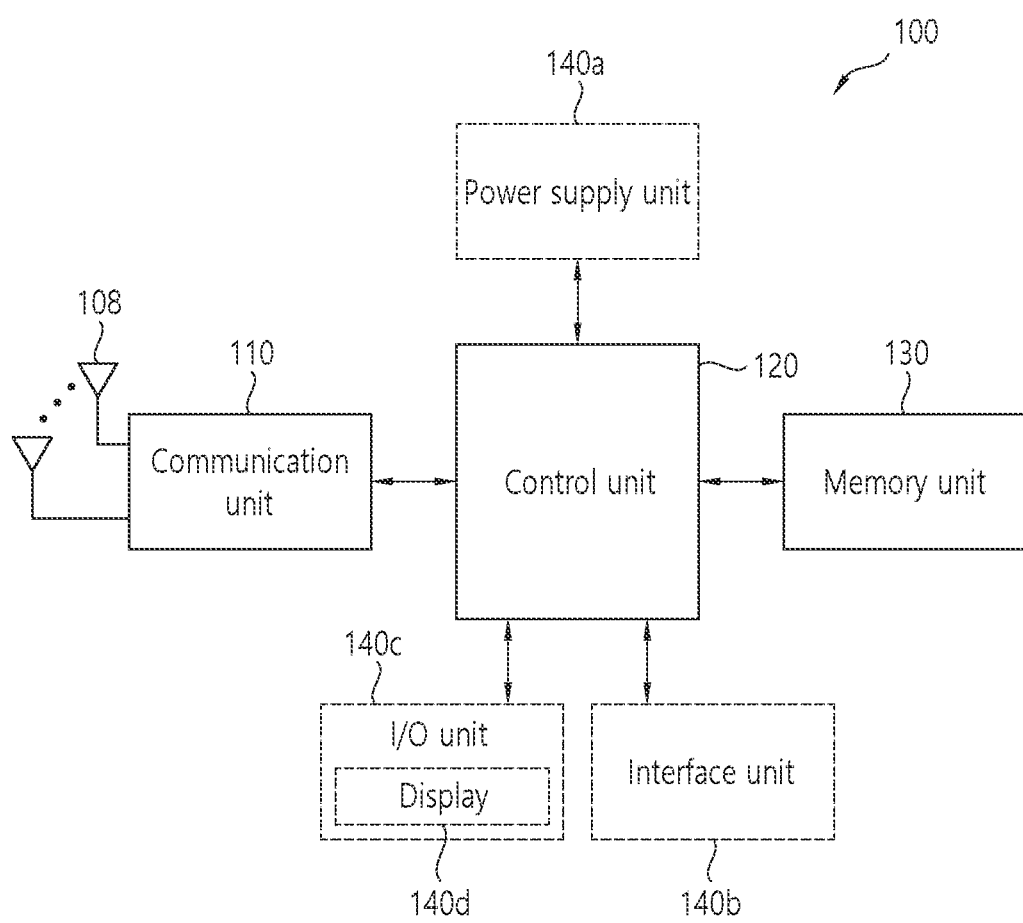
FIG. 19 illustrates a hand-held device applied to the disclosure.

FIG. 19 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 19, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 18, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device.

The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 20:
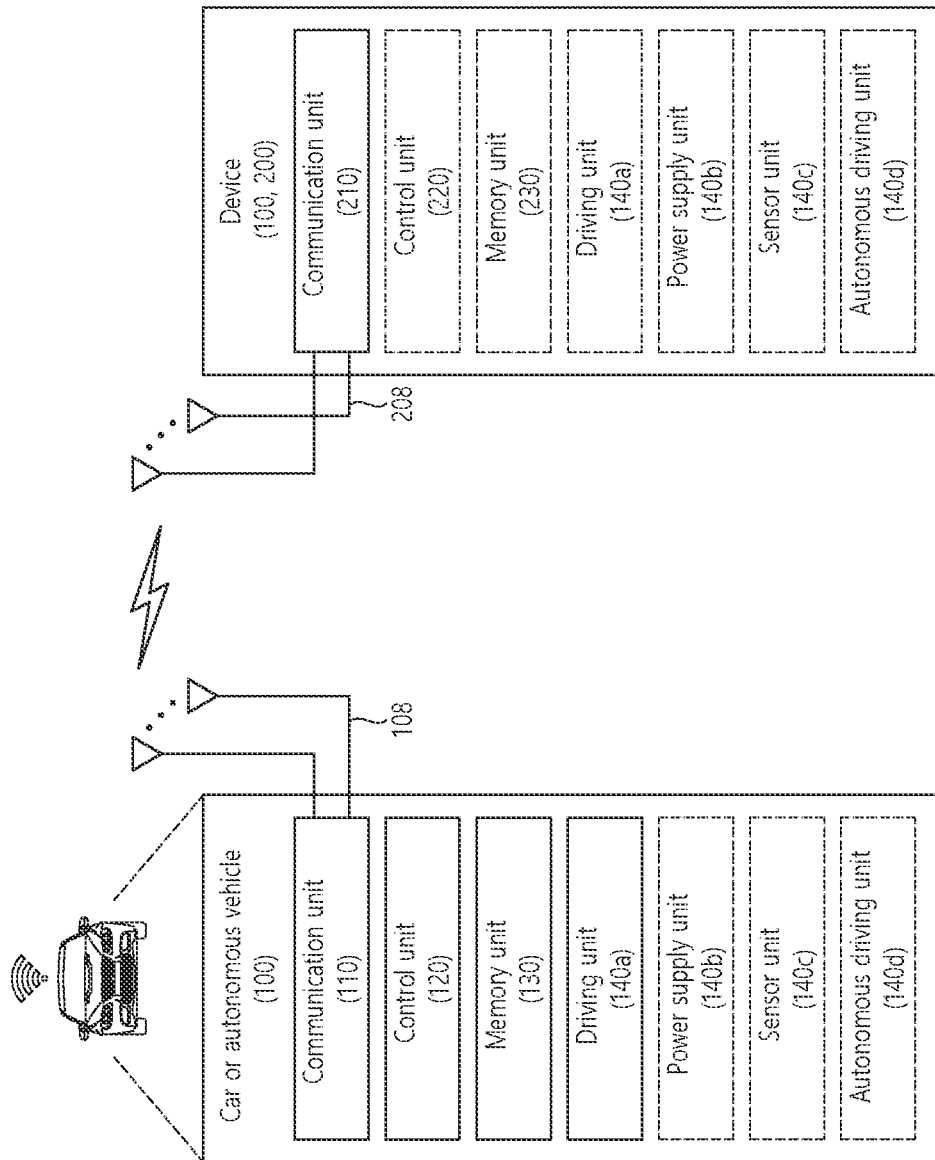
FIG. 20 illustrates a vehicle or an autonomous driving vehicle applied to the disclosure.

FIG. 20 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 20, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 18, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Figure 21:
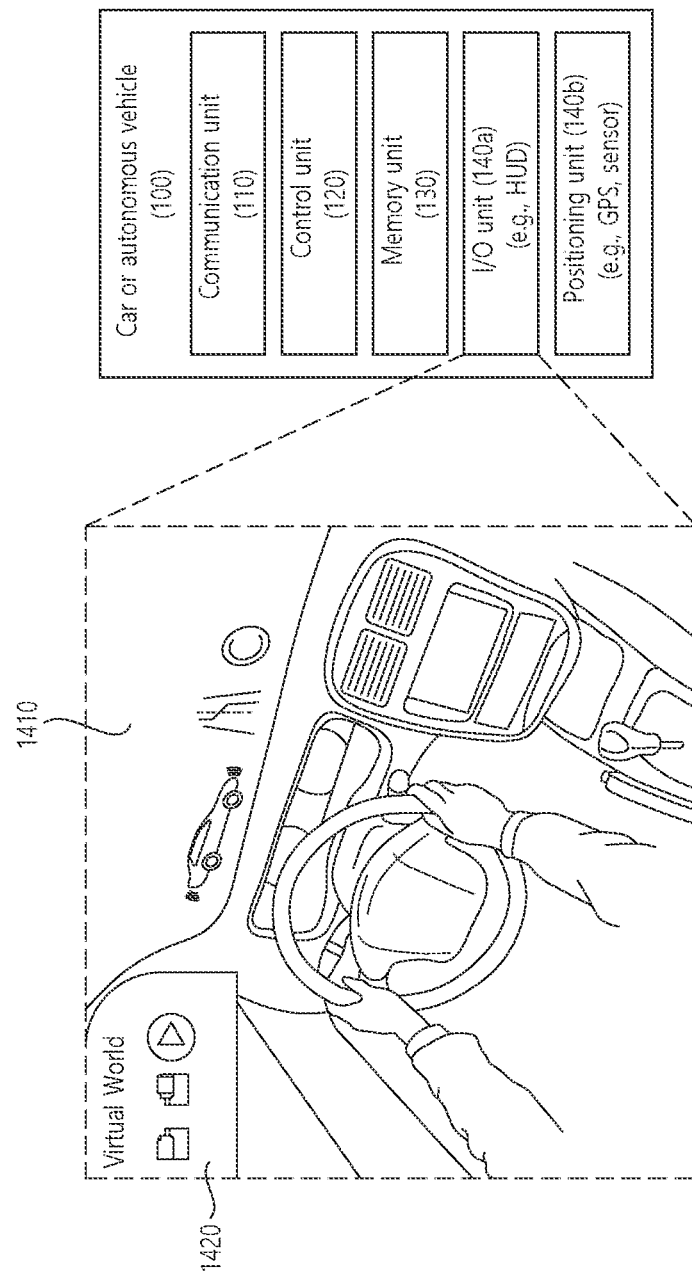
FIG. 21 illustrates a vehicle applied to the disclosure.

FIG. 21 illustrates a vehicle applied to the disclosure. The vehicle may be implemented as a means of transportation, a train, an air vehicle, a ship, and the like.

Referring to FIG. 21, the vehicle 100 may include a communication unit 110, a control unit 120, a memory unit 130, an input/output unit 140a, and a positioning unit 140b. Herein, blocks 110 to 130/140a to 140b correspond to block 110 to 130/140 of FIG. 18, respectively.

The communication unit 110 may transmit/receive signals (e.g., data, control signals, etc.) with other vehicles or external devices such as a base station. The control unit 120 may control components of the vehicle 100 to perform various operations. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire position information of the vehicle 100. The location information may include absolute location information of the vehicle 100, location information within a driving line, acceleration information, location information with a neighboring vehicle, and the like. The positioning unit 140b may include a GPS and various sensors.

For example, the communication unit 110 of the vehicle 100 may receive map information, traffic information, and the like from an external server and store it in the memory unit 130. The positioning unit 140b may obtain vehicle position information through GPS and various sensors and store it in the memory unit 130. The control unit 120 may generate a virtual object based on map information, traffic information, vehicle location information, and the like, and the input/output unit 140a may display the generated virtual object on a window inside the vehicle (1410 and 1420). In addition, the control unit 120 may determine whether the vehicle 100 is normally operating within the driving line based on the vehicle location information. When the vehicle 100 abnormally deviates from the driving line, the control unit 120 may display a warning on the windshield of the vehicle through the input/output unit 140a. Also, the control unit 120 may broadcast a warning message regarding the driving abnormality to surrounding vehicles through the communication unit 110. Depending on the situation, the control unit 120 may transmit the location information of the vehicle and information on driving/vehicle abnormality to the related organization through the communication unit 110.

Figure 22:
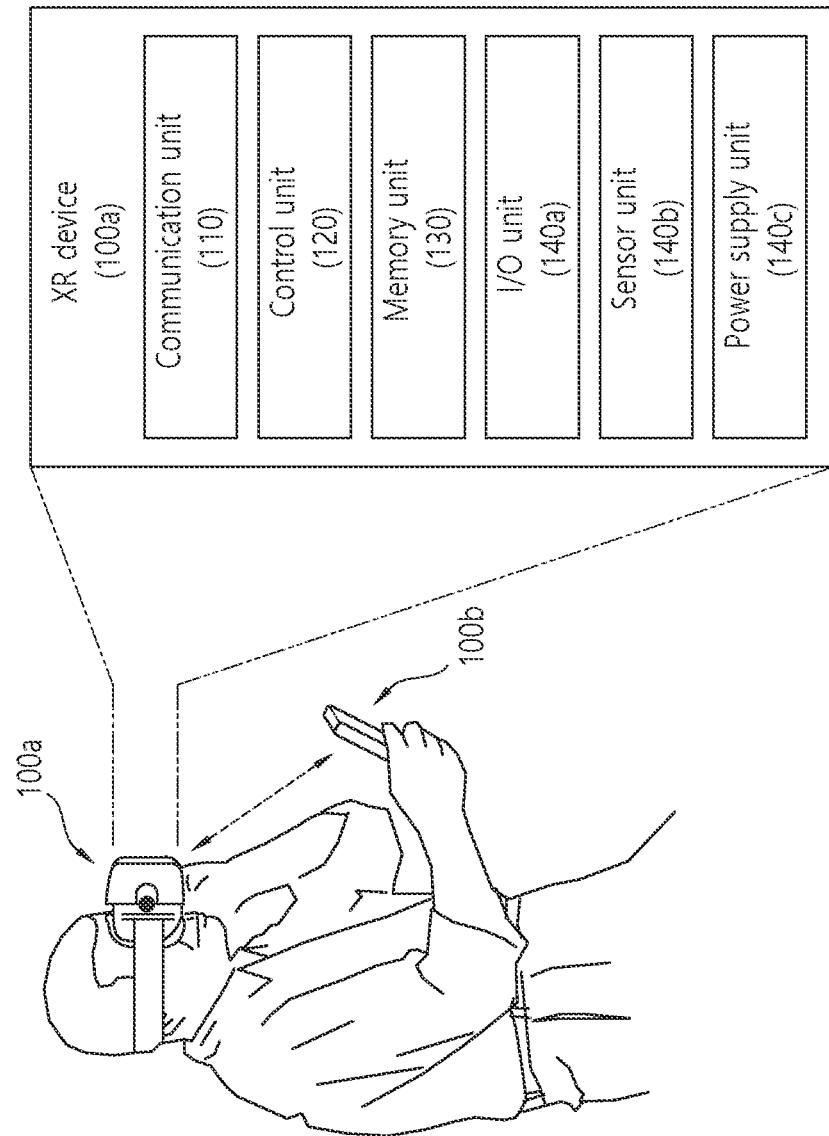
FIG. 22 illustrates a XR device applied to the disclosure.

FIG. 22 illustrates a XR device applied to the disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 22, the XR device 100a may include a communication unit 110, a control unit 120, a memory unit 130, an input/output unit 140a, a sensor unit 140b and a power supply unit 140c. Herein, blocks 110 to 130/140a to 140c correspond to blocks 110 to 130/140 in FIG. 18.

The communication unit 110 may transmit/receive signals (e.g., media data, control signals, etc.) to/from external devices such as other wireless devices, portable devices, or media servers. Media data may include images, images, sounds, and the like. The control unit 120 may control the components of the XR device 100a to perform various operations. For example, the control unit 120 may be configured to control and/or perform procedures such as video/image acquisition, (video/image) encoding, and metadata generation and processing. The memory unit 130 may store data/parameters/programs/codes/commands necessary for driving the XR device 100a/creating an XR object. The input/output unit 140a may obtain control information, data, and the like from the outside, and may output the generated XR object. The input/output unit 140a may include a camera, a microphone, a user input unit, a display unit, a speaker, and/or a haptic module.

The sensor unit 140b may obtain an XR device state, surrounding environment information, user information, and the like. The sensor unit 140b may include a proximity sensor, an illumination sensor, an acceleration sensor, a magnetic sensor, a gyro sensor, an inertial sensor, a RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data, etc.) necessary for generating an XR object (e.g., AR/VR/MR object). The input/output unit 140a may obtain a command to operate the XR device 100a from the user, and the control unit 120 may drive the XR device 100a according to the user's driving command. For example, when the user wants to watch a movie or news through the XR device 100a, the control unit 120 transmits the content request information through the communication unit 130 to another device (e.g., the mobile device 100b) or can be sent to the media server. The communication unit 130 may download/stream contents such as movies and news from another device (e.g., the portable device 100b) or a media server to the memory unit 130. The control unit 120 controls and/or performs procedures such as video/image acquisition, (video/image) encoding, and metadata generation/processing for the content, and is acquired through the input/output unit 140a/the sensor unit 140b An XR object can be generated/output based on information about one surrounding space or a real object.

Also, the XR device 100a is wirelessly connected to the portable device 100b through the communication unit 110, and the operation of the XR device 100a may be controlled by the portable device 100b. For example, the portable device 100b may operate as a controller for the XR device 100a. To this end, the XR device 100a may obtain 3D location information of the portable device 100b, and then generate and output an XR object corresponding to the portable device 100b.

Figure 23:
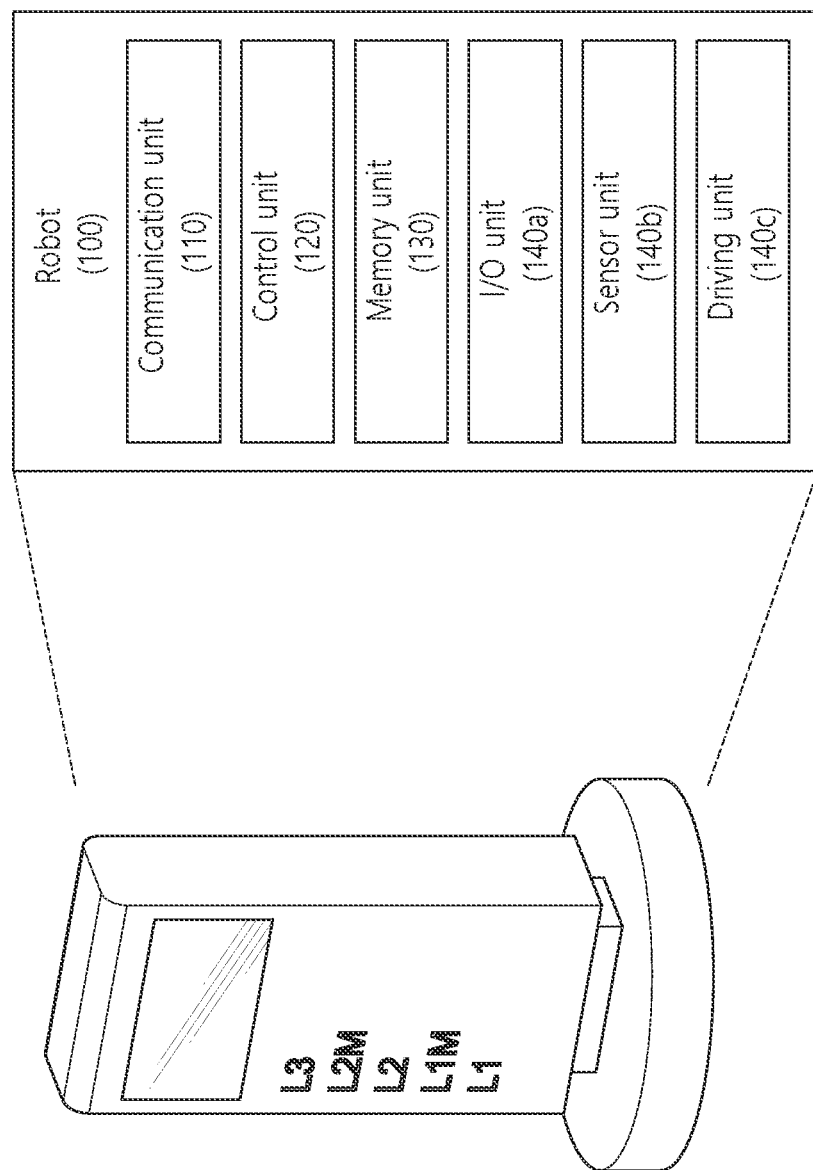
FIG. 23 illustrates a robot applied to the disclosure.

FIG. 23 illustrates a robot applied to the disclosure. The robot may be classified into industrial, medical, home, military, and the like depending on the purpose or field of use.

Referring to FIG. 23, the robot 100 may include a communication unit 110, a control unit 120, a memory unit 130, an input/output unit 140a, a sensor unit 140b, and a driving unit 140c. Herein, blocks 110 to 130/140a to 140c correspond to blocks 110 to 130/140 in FIG. 18.

The communication unit 110 may transmit/receive signals (e.g., driving information, control signal, etc.) to/from external device such as other wireless device, other robot, or a control server. The control unit 120 may perform various operations by controlling the components of the robot 100. The memory unit 130 may store data/parameters/programs/codes/commands supporting various functions of the robot 100. The input/output unit 140a may obtain information from the outside of the robot 100 and may output information to the outside of the robot 100. The input/output unit 140a may include a camera, a microphone, an user input unit, a display unit, a speaker, and/or a haptic module, etc. The sensor unit 140b may obtain internal information, surrounding environment information, user information and the like of the robot 100. The sensor unit may include a proximity sensor, an illumination sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140c may perform various physical operations such as moving a robot joint. In addition, the driving unit 140c may make the robot 100 travel on the ground or fly in the air. The driving unit 140c may include an actuator, a motor, a wheel, a brake, a propeller, and the like.

Figure 24:
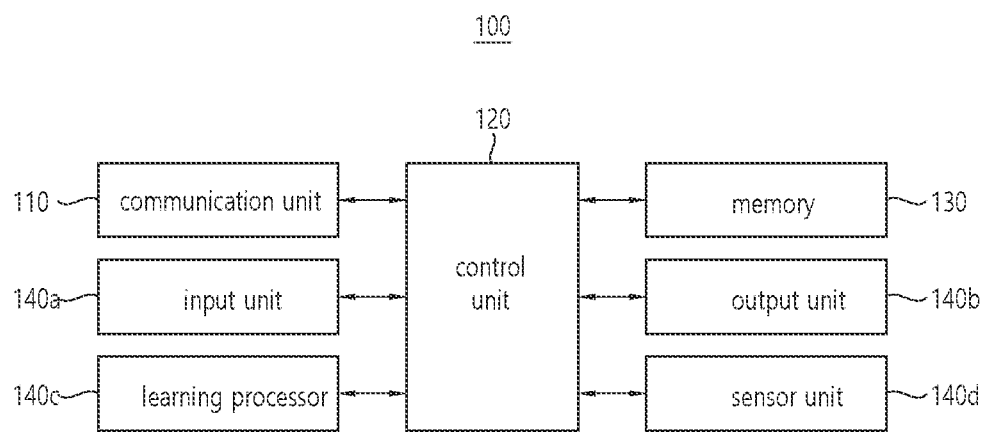
FIG. 24 illustrates an AI device applied to the disclosure.

FIG. 24 illustrates an AI device applied to the disclosure. The AI device may be implemented as a stationary device or a mobile device, such as a TV, a projector, a smartphone, a PC, a laptop, a digital broadcasting terminal, a tablet PC, a wearable device, a set-top box, a radio, a washing machine, a refrigerator, digital signage, a robot, and a vehicle.

Referring to FIG. 24, the AI device 100 may include a communication unit 110, a control unit 120, a memory unit 130, an input unit 140a, an output unit 140b, a learning processor unit 140c, and a sensor unit 140d. Blocks 110 to 130/140a to 140d correspond to the blocks 110 to 130/140 of FIG. 18, respectively.

The communication unit 110 may transmit and receive wired or wireless signals (e.g., sensor information, a user input, a learning mode, a control signal, or the like) to and from external devices, a different AI device (e.g., 100x, 200, or 400 in FIG. 15) or an AI server (e.g., 400 in FIG. 15) using wired or wireless communication technologies. To this end, the communication unit 110 may transmit information in the memory unit 130 to an external device or may transmit a signal received from the external device to the memory unit 130.

The control unit 120 may determine at least one executable operation of the AI device 100 on the basis of information determined or generated using a data analysis algorithm or a machine-learning algorithm. The control unit 120 may control components of the AI device 100 to perform the determined operation. For example, the control unit 120 may request, retrieve, receive, or utilize data of the learning processor unit 140c or the memory unit 130 and may control components of the AI device 100 to perform a predicted operation or an operation determined to be preferable among the at least one executable operation. The control unit 120 may collect history information including details about an operation of the AI device 100 or a user's feedback on the operation and may store the history information in the memory unit 130 or the learning processor unit 140c or may transmit the history information to an external device, such as the AI server (400 in FIG. 15). The collected history information may be used to update a learning model.

The memory unit 130 may store data for supporting various functions of the AI device 100. For example, the memory unit 130 may store data obtained from the input unit 140a, data obtained from the communication unit 110, output data from the learning processor unit 140c, and data obtained from the sensing unit 140. Further, the memory unit 130 may store control information and/or a software code necessary for the operation/execution of the control unit 120.

The input unit 140a may obtain various types of data from the outside of the AI device 100. For example, the input unit 140a may obtain learning data for model learning and input data to which a learning model is applied. The input unit 140a may include a camera, a microphone, and/or a user input unit. The output unit 140b may generate visual, auditory, or tactile output. The output unit 140b may include a display unit, a speaker, and/or a haptic module. The sensing unit 140 may obtain at least one of internal information about the AI device 100, environmental information about the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar.

The learning processor unit 140c may train a model including artificial neural networks using learning data. The learning processor unit 140c may perform AI processing together with a learning processor unit of an AI server (400 in FIG. 15). The learning processor unit 140c may process information received from an external device through the communication unit 110 and/or information stored in the memory unit 130. In addition, an output value from the learning processor unit 140c may be transmitted to an external device through the communication unit 110 and/or may be stored in the memory unit 130.

The claims described herein may be combined in various ways. For example, the technical features of the method claims in the present disclosure may be combined and implemented as an apparatus, and the technical features of the device claims in the present disclosure may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method performed by a user equipment (UE) in a wireless communication system, the method comprising:
   receiving repeated transmission configuration information;
   wherein the repeated transmission configuration information is information for configuring repeated transmission for a physical uplink shared channel (PUSCH) to the UE, and
   wherein the repeated transmission configuration information informs a plurality of time domain resource sets in which the repeated transmission is performed,
   receiving a timing advance command; and
   based on that an event is included in a specific time domain resource set included in the plurality of time domain resource sets, performing a PUSCH transmission within an actual time domain resource set included in the specific time domain resource set,
   wherein the event which causes channel characteristics not to be maintained across the repeated transmission is an uplink timing adjustment in response to the timing advance command,
   wherein a start of the actual time domain resource set is a first symbol of the PUSCH transmission immediately after the event within the specific time domain resource set, and
   wherein an end of the actual time domain resource set is a last symbol of the PUSCH transmission which reaches an end of the specific time domain resource set.

2. The method of claim 1, wherein each of the plurality of time domain resource sets is repeatedly configured in a time domain based on the repeated transmission configuration information.

3. The method of claim 1, wherein the plurality of time domain resource sets are configured for transmission of a demodulation reference signal (DMRS) bundle.

4. The method of claim 3, wherein a resource configured as the DMRS bundle is configured to have the same channel characteristics or to be included in a specific range.

5. The method of claim 4, wherein the channel characteristics include some or all of a transmission/reception spatial filter, indices of the spatial filters, a holding time of a TA command, transmit power, a Doppler effect, and a coherence time.

6. The method of claim 3, wherein the channel characteristics of the DMRS bundle transmitted in the plurality of time domain resource sets are the same for resources included in the plurality of time domain resource sets or included in a specific range.

7. The method of claim 6, wherein the channel characteristics of the DMRS bundle are the same for resources included in the plurality of time domain resource sets and the actual time domain resource set or included in a specific range.

8. The method of claim 1, wherein the actual time domain resource set is configured from a resource immediately after the event in the time domain.

9. The method of claim 1, wherein, based on that the UE receives a group common transmission power control (TPC) command within the specific time domain resource set, the UE performs an uplink power control based on the group common TPC command after the specific time domain resource set is terminated.

10. A user equipment (UE) comprising:
one or more memories configured to store instructions;
one or more transceivers; and
one or more processors configured to connect the one or more memories to the one or more transceivers,
wherein the one or more processors execute the instructions to:
receive repeated transmission configuration information,
wherein the repeated transmission configuration information is information for configuring repeated transmission for a physical uplink shared channel (PUSCH) to the UE, and
wherein the repeated transmission configuration information informs a plurality of time domain resource sets in which the repeated transmission is performed,
receive a timing advance command, and
based on that an event is included in a specific time domain resource set included in the plurality of time domain resource sets, perform a PUSCH transmission within an actual time domain resource set included in the specific time domain resource set,
wherein the event which causes channel characteristics not to be maintained across the repeated transmission is an uplink timing adjustment in response to the timing advance command,
wherein a start of the actual time domain resource set is a first symbol of the PUSCH transmission immediately after the event within the specific time domain resource set, and
wherein an end of the actual time domain resource set is a last symbol of the PUSCH transmission which reaches an end of the specific time domain resource set.

11. The UE of claim 10, wherein, based on that the UE receives a group common transmission power control (TPC) command within the specific time domain resource set, the UE performs an uplink power control based on the group common TPC command after the specific time domain resource set is terminated.

12. An apparatus configured to control a user equipment (UE), the apparatus comprising:
one or more processors; and
one or more memories connected to be operable by the one or more processors and configured to store instructions,
wherein the one or more processor execute the instructions to:
receive repeated transmission configuration information,
wherein the repeated transmission configuration information is information for configuring repeated transmission for a physical uplink shared channel (PUSCH) to the UE, and
wherein the repeated transmission configuration information informs a plurality of time domain resource sets in which the repeated transmission is performed,
receive a timing advance command, and
based on that an event is included in a specific time domain resource set included in the plurality of time domain resource sets, perform a PUSCH transmission within an actual time domain resource set included in the specific time domain resource set,
wherein the event which causes channel characteristics not to be maintained across the repeated transmission is an uplink timing adjustment in response to the timing advance command,
wherein a start of the actual time domain resource set is a first symbol of the PUSCH transmission immediately after the event within the specific time domain resource set, and
wherein an end of the actual time domain resource set is a last symbol of the PUSCH transmission which reaches an end of the specific time domain resource set.

13. The apparatus of claim 12, wherein, based on that the UE receives a group common transmission power control (TPC) command within the specific time domain resource set, the UE performs an uplink power control based on the group common TPC command after the specific time domain resource set is terminated.

* * * * *